US007526656B2

(12) United States Patent
Inomata et al.

(10) Patent No.: US 7,526,656 B2
(45) Date of Patent: Apr. 28, 2009

(54) ENCRYPTION/DECRYPTION SYSTEM AND METHOD FOR THE SAME

(75) Inventors: Kohshiro Inomata, Ashigarakami-gun (JP); Yasutoshi Maeda, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 761 days.

(21) Appl. No.: 10/230,166

(22) Filed: Aug. 29, 2002

(65) Prior Publication Data
US 2003/0046560 A1 Mar. 6, 2003

(30) Foreign Application Priority Data
Sep. 3, 2001 (JP) ............................. 2001-265235

(51) Int. Cl.
*G06F 11/30* (2006.01)
(52) U.S. Cl. .................... 713/189; 713/155; 713/182; 713/193; 380/29; 380/43; 380/44; 380/277; 380/282
(58) Field of Classification Search .............. 380/29, 380/277, 43–44, 282; 713/155, 182, 189, 713/193
See application file for complete search history.

(56) References Cited
U.S. PATENT DOCUMENTS 6,114,743 A * 9/2000 Gris ........................... 257/586
6,230,267 B1 * 5/2001 Richards et al. .............. 713/172
6,253,322 B1 * 6/2001 Susaki et al. ................. 713/170
6,378,070 B1 * 4/2002 Chan et al. ................... 713/155
6,775,382 B1 * 8/2004 Al-Salqan .................... 380/286
6,947,556 B1 * 9/2005 Matyas et al. ................. 380/29
6,970,566 B1 * 11/2005 Kimura ....................... 380/282
2002/0044654 A1 * 4/2002 Maeda et al. .................. 380/43
2002/0063933 A1 * 5/2002 Maeda et al. ................. 359/173
2002/0114467 A1 * 8/2002 Vatanen ....................... 380/270

FOREIGN PATENT DOCUMENTS

| JP | A 9-167220 | 6/1997 |
| JP | A 9-219700 | 8/1997 |
| JP | A-2000-059352 | 2/2000 |
| JP | A 2001-111538 | 4/2001 |

* cited by examiner

*Primary Examiner*—Baotran N To
(74) *Attorney, Agent, or Firm*—Oliff & Berridge, PLC

(57) ABSTRACT

An encryption/decryption system capable of supplying data only to a user making a request. A computer encrypts data with a common key, encrypts the common key with a public key, and transmits the encrypted data and the encrypted common key. A copy machine receives these data, encrypts challenge data with the public key, and transmits the encrypted challenge data to an IC card. The IC card decrypts the encrypted challenge data with a private key, and feeds the decrypted challenge data back to the copy machine. The copy machine transmits the IC card an encrypted common key of reception data offering decrypted challenge data identical to the original challenge data. The IC card decrypts the encrypted common key and feeds the decrypted common key back to the complex copy machine. The complex copy machine decrypts the encrypted data with the common key.

6 Claims, 19 Drawing Sheets

FIG. 8

| TRANSMISSION DATA Ci | ENCRYPTED DATA $f(M_i, K_i)$ | ENCRYPTED COMMON KEY $g(K_i, K_{pi})$ | PUBLIC KEY $K_{pi}$ |

FIG. 10

| | | | |
|---|---|---|---|
| C1 | f (M1, K1) | g (Kl, Kp1) | Kp1 |
| C2 | f (M2, K2) | g (K2, Kp2) | Kp2 |
| C3 | f (M3, K3) | g (K3, Kp3) | Kp3 |
| C4 | f (M4, K4) | g (K4, Kp4) | Kp4 |
| C5 | f (M5, K5) | g (K5, Kp5) | Kp5 |
| C6 | f (M6, K6) | g (K6, Kp6) | Kp6 |
| ⋮ | ⋮ | ⋮ | ⋮ |
| Ci | f (Mi, Ki) | g (Ki, Kpi) | Kpi |
| ⋮ | ⋮ | ⋮ | ⋮ |
| Cl - 1 | f (Ml - 1, Kl - 1) | g (Kl - 1, Kpl - 1) | Kpl - 1 |
| Cl | f (Ml, Kl) | g (Kl, Kpl) | Kpl |

ENCRYPTION/DECRYPTION SYSTEM AND METHOD FOR THE SAME

BACKGROUND OF THE INVENTION

1. Field of the Invention

The present invention relates to an encryption/decryption system for encrypting data and decrypting the encrypted data, encryption apparatus, decryption apparatus, and method for those system and apparatus.

2. Background Art

There is a demand that a user wants to gain access to a server through a network so as to be serviced therefrom even if the server is installed in a place an unspecified number of persons can visit.

In the future, a system meeting such a demand will be required to realize, for example, such a service that a user will make a request to a government office through a network for a document including private information, and the requested document will be printed out by use of a printer installed in a convenience store in the neighborhood of the user.

To realize such a system, a mechanism for keeping secret is essential to prevent private information from being leaked. For example, to print out a document is approved by the printer only when a user making a request for the document gains access to the printer.

In addition, even in an office which is not visited by an unspecified number of persons, it is desired that such a mechanism for keeping secret is provided similarly when a plurality of users share a printer.

For example, "Japanese Patent Laid-Open No. 219700/1997" (Document 1) discloses a system for encrypting data by use of an IC card in data communication apparatus.

However, this system is fundamentally premised on one-to-one communication between computers. The system cannot be applied to a system using apparatus to which an unspecified number of persons can gain access, as described above.

In addition, for example, "Japanese Patent Laid-Open No. 167220/1997" (Document 2) and "Japanese Patent Laid-Open No. 2001-111538" (Document 3) disclose encryption/decryption methods in data communication.

However, in the method disclosed in Document 2, a user has to input a private key to a reception terminal when the user receives data. There is a fear that the private key is leaked out.

On the other hand, in the method disclosed in Document 3, a plurality of users cannot be set as destinations for one piece of encrypted data. In addition, when a large number of pieces of encrypted data are spooled in reception apparatus, a user cannot retrieve data addressed to the user.

SUMMARY OF THE INVENTION

The invention was developed in consideration of the problems belonging to the related art. It is an object of the invention to provide an encryption/decryption system, encryption apparatus, decryption apparatus and methods for those system and apparatus, which are suitable to applications for outputting data from a server only when a user making a request for service gains access to the server even if a plurality of users share the server.

It is another object of the invention to provide an encryption/decryption system, encryption apparatus, decryption apparatus and methods for those system and apparatus, which are suitable to applications for transmitting messages from unspecified senders to unspecified receivers securely.

It is a further object of the intention to provide an encryption/decryption system, encryption apparatus, decryption apparatus and methods for those system and apparatus, in which any user does not have to input private information to a shared server when the user receives encrypted data from the shared server, so that the security is enhanced.

It is a still further object of the invention to provide an encryption/decryption system, encryption apparatus, decryption apparatus and methods for those system and apparatus, in which data addressed to a plurality of users can be encrypted and delivered to the addressed users through a shared server surely.

It is another object of the invention to provide an encryption/decryption system, encryption apparatus, decryption apparatus and methods for those system and apparatus, in which any user can retrieve and receive encrypted data addressed to the user himself/herself easily even when a large number of pieces of encrypted data are spooled on the reception side.

In order to achieve these objects, according to the invention, there is provided an encryption/decryption system having: one or more pieces of encryption apparatus for encrypting first target data to be encrypted with one or more pieces of first key data set for one or more destinations, so as to generate pieces of first encrypted data addressed to the destinations, respectively; and one or more pieces of first decryption apparatus for decrypting the pieces of the first encrypted data with one or more pieces of second key data set for the destinations of the first encrypted data, so as to obtain the first target data.

Preferably, the first target data is an encryption/decryption key to be used for encrypting and decrypting second target data to be encrypted, each piece of the first key data is an encryption key set for each of the destinations and to be used for encrypting data, each piece of the second key data is a decryption key set for each of the destinations and to be used for decrypting data encrypted with the encryption key, each piece of the encryption apparatus includes a first encryption unit for encrypting the second target data with the encryption/decryption key so as to form second encrypted data; and a second encryption unit for encrypting the encryption/decryption key with the encryption keys of the destinations so as to generate the pieces of first encrypted data addressed to the destinations respectively; and each piece of the first decryption apparatus includes: a first decryption unit for decrypting each piece of the first encrypted data with the decryption keys of the destinations, so as to obtain the encryption/decryption key.

Preferably, each piece of the encryption apparatus further includes: an association unit for associating at least each piece of the first encrypted data addressed to the destinations with the generated second encrypted data; the encryption/decryption system further includes second decryption apparatus including: a reception unit for receiving each piece of the first encrypted data and the second encrypted data associated with each other; and a second decryption unit supplied with the decrypted encryption/decryption key and using the supplied encryption/decryption key to decrypt the received second encrypted data into the second target data; and the first decryption unit of each piece of the first decryption apparatus uses the decryption keys of the destinations to decrypt each piece of the received first encrypted data into an encryption/decryption key which is used for decrypting the received second encrypted data.

Preferably, the second decryption apparatus further includes: an output unit for outputting the decrypted second target data.

Preferably, each piece of the first decryption apparatus further includes: a first key generation unit for generating an encryption key and a decryption key for each of at least one of the destinations.

Preferably, the encryption/decryption system further has key supply apparatus including: a second key generation unit for generating an encryption key and a decryption key for each of at least one of the destinations; a first encryption key supply unit for supplying the generated encryption key to the encryption apparatus or to the encryption apparatus and the first decryption apparatus in response to a request; and a decryption key supply unit for supplying the generated decryption key to the first decryption apparatus.

Preferably, the association unit of each piece of the encryption apparatus is supplied with the encryption keys of the destinations, and further associates the supplied encryption keys of the destinations with each piece of the first encrypted data and the second encrypted data; the reception unit of the second decryption apparatus further receives the encryption keys of the destinations associated with each piece of the first encrypted data and the second encrypted data; the second decryption apparatus further includes: a first encrypted data supply unit for supplying each piece of the first encrypted data associated with the supplied encryption keys in accordance with the received encryption keys; and the first decryption unit of each piece of the first decryption apparatus uses the decryption keys of the destinations to decrypt each piece of the supplied first encrypted data into an encryption/decryption key.

Preferably, the association unit of each piece of the encryption apparatus further associates the encryption keys of the destinations with each piece of the first encrypted data and the second encrypted data; the reception unit of the second decryption apparatus further receives the encryption keys of the destinations associated with each piece of the first encrypted data and the second encrypted data; the second decryption apparatus includes: a third encryption unit for encrypting given data with the received encryption keys so as to generate third encrypted data respectively, and supplying the third encrypted data; and a second encrypted data supply unit; each piece of the first decryption apparatus further includes: a third decryption unit for decrypting each piece of the supplied third encrypted data with the decryption keys of the destinations so as to obtain pieces of first decrypted data, and supplying the first decrypted data; the second encrypted data supply unit supplies each piece of the first encrypted data corresponding to the supplied encryption keys in accordance with each piece of the supplied first decrypted data; and the first decryption unit of each piece of the first decryption apparatus decrypts each piece of the supplied first encrypted data with each of the decryption keys of the destinations so as to obtain an encryption/decryption key.

Preferably, each piece of the first decryption apparatus is one of an IC card, a cellular phone and a portable terminal unit; and each piece of the first decryption apparatus further includes: a communication unit for making communication with the second decryption apparatus.

Preferably, each piece of the first decryption apparatus further includes: a user identification unit for authenticating a user engaged in operation; and the first decryption apparatus operates only in accordance with operation of the authenticated user.

[Description of Encryption/Decryption System]

The encryption/decryption system according to the invention will be described below by way of example.

Incidentally, examples which will be shown below are not intended to limit the technical scope of the invention but intended to embody the invention so as to help the invention be understood.

Description of Encryption

In the encryption in the encryption/decryption system according to the invention, a data body (body data; second target data) to be encrypted is first encrypted with a common key (encryption/decryption key).

Further, the common key used for encrypting the data body is encrypted with public keys (encryption data) set for addressed users respectively.

The body data (encrypted body data; second encrypted data) encrypted with the common key, the common key (encrypted common key; first encrypted data) encrypted with a public key, and the public key itself are associated and sent to the decryption side.

Incidentally, when there are a plurality of addressed users, common keys encrypted with public keys of a plurality of destinations respectively, and the plurality of public keys themselves are associated with the encrypted body data and sent to the decryption side.

[Description of Decryption]

On the decryption side where the body data encrypted as described above is decrypted, for example, second decryption apparatus for decrypting the body data is provided in a printer used for printing out the body data, while first decryption apparatus for decrypting the encrypted common key is, for example, implemented by a cellular phone, a portable terminal (PDA) or an IC card.

Between the first decryption apparatus and the second decryption apparatus, data is transmitted and received by cable communication or wireless communication using radio waves or infrared light, so that the first decryption apparatus and the second decryption apparatus cooperate with each other in decrypting and outputting the body data.

When communication is initiated between the first decryption apparatus and the second decryption apparatus, the second decryption apparatus encrypts dummy data (given data) generated, for example, from a random number or the like with all the public keys received till then individually, so as to generate encrypted dummy data (encrypted dummy data; third encrypted data). The encrypted dummy data is sent to the first decryption apparatus.

For example, in the first decryption apparatus, a private key (decryption key) is set for each of the plurality of destinations individually in advance. All pieces of the encrypted dummy data sent to the first decryption apparatus are decrypted with the decryption key. All the pieces of the decrypted encrypted dummy data (first decrypted data) are fed back to the second decryption apparatus.

It can be understood easily that only one piece of the encrypted dummy data decrypted with a public key corresponding to the private key is decrypted into dummy data identical to the original dummy data, while the other pieces of the encrypted dummy data are decrypted into data different from the original dummy data.

In the second decryption apparatus, by use of the public key offering the dummy data identical to the original dummy data, an encryption common key associated with this public key is decrypted, and the encrypted body data associated with this public key is decrypted with this decrypted common key. Thus, the original body data is obtained.

Incidentally, as described above, when there are a plurality of addressed users, the second decryption apparatus decrypts a common key with any one of a plurality of public keys offering original dummy data, and further decrypts encrypted body data with this common key.

[Encryption Apparatus]

Means for solving the problems will be shown below again.

Further, according to the invention, there is provided encryption apparatus for encrypting an encryption/decryption key with one or more encryption keys so as to generate one or more pieces of first encrypted data addressed to one or more destinations respectively, the encryption/decryption key being used for encrypting and decrypting target data to be encrypted, the encryption keys being set for the destinations and to be used for encrypting data, the respective pieces of the first encrypted data being decrypted with one or more decryption keys so as to obtain the encryption/decryption key, the decryption keys being set for the destinations and to be used for decrypting data encrypted with the encryption keys, the encryption apparatus having: a first encryption unit for encrypting second target data with the encryption/decryption key so as to generate second encrypted data; and a second encryption unit for encrypting the encryption/decryption key with the encryption keys of the destinations so as to generate the pieces of first encrypted data addressed to the destinations respectively.

[Decryption Apparatus]

Further, according to the invention, there is provided decryption apparatus for decrypting first encrypted data obtained by encrypting an encryption/decryption key with one or more encryption keys, the encryption/decryption key being used for encrypting and decrypting target data to be encrypted, the encryption keys being set for one or more destinations and to be used for encrypting data, wherein the first encrypted data is decrypted into the encryption/decryption key by use of one or more decryption keys set for the destinations and to be used for decrypting data encrypted with the encryption keys.

[Encryption/Decryption Method]

Further, according to the invention, there is provided an encryption/decryption method having the steps of: encrypting first target data to be encrypted with one or more pieces of first key data so as to generate one or more pieces of first encrypted data addressed to one or more destinations respectively, the first key data being set for the destinations; and decrypting each piece of the first encrypted data with one or more pieces of second key data so as to obtain the first target data, the second key data being set for the destinations of the first encrypted data.

[Encryption Method]

Further, according to the invention, there is provided an encryption method for encrypting an encryption/decryption key with one or more encryption keys so as to generate one or more pieces of first encrypted data addressed to one or more destinations respectively, the encryption/decryption key being used for encrypting and decrypting target data to be encrypted, the encryption keys being set for the destinations and to be used for encrypting data, each piece of the first encrypted data being decrypted with one or more decryption keys so as to obtain the encryption/decryption key, the decryption keys being set for the destinations and to be used for decrypting data encrypted with the encryption keys, the encryption method having the steps of: encrypting second target data with the encryption/decryption key so as to generate second encrypted data; and encrypting the encryption/ decryption key with the encryption keys of the destinations so as to generate pieces of first encrypted data addressed to the destinations respectively.

[Decryption Method]

Further, according to the invention, there is provided a decryption method for decrypting first encrypted data obtained by encrypting an encryption/decryption key with one or more encryption keys, the encryption/decryption key being used for encrypting and decrypting target data to be encrypted, the encryption keys being set for one or more destinations and to be used for encrypting data, the decryption method having the step of: decrypting the first encrypted data into the encryption/decryption key by use of one or more decryption keys set for the destinations and to be used for decrypting data encrypted with the encryption keys.

[First Program]

Further, according to the invention, there is provided a first program for making a computer execute the steps of: encrypting first target data to be encrypted with one or more pieces of first key data so as to generate one or more pieces of first encrypted data addressed to one or more destinations respectively, the first key data being set for the destinations; and decrypting each piece of the first encrypted data with one or more pieces of second key data so as to obtain the first target data, the second key data being set for the destinations of the first encrypted data.

[Second Program]

Further, according to the invention, there is provided a second program for performing an encryption method in which an encryption/decryption key is encrypted with one or more encryption keys so as to generate one or more pieces of first encrypted data addressed to one or more destinations respectively, the encryption/decryption key being used for encrypting and decrypting target data to be encrypted, the encryption keys being set for the destinations and to be used for encrypting data, each piece of the first encrypted data being decrypted with one or more decryption keys set for the destinations and to be used for decrypting data encrypted with the encryption keys, the second program making a computer execute the steps of: encrypting second target data with the encryption/decryption key so as to generate second encrypted data; and encrypting the encryption/decryption key with the encryption keys of the destinations so as to generate the pieces of first encrypted data addressed to the destinations respectively.

Further, according to the invention, there is provided a third program for decrypting first encrypted data obtained by encrypting an encryption/decryption key with one or more encryption keys, the encryption/decryption key being used for encrypting and decrypting target data to be encrypted, the encryption keys being set for one or more destinations and to be used for encrypting data, the third program making a computer execute the step of: decrypting the first encrypted data into the encryption/decryption key by use of one or more decryption keys set for the destinations and to be used for decrypting data encrypted with the encryption keys.

BRIEF DESCRIPTION OF THE DRAWINGS

FIG. 8 is a table showing a format of transmission data Ci generated by a transmission data composition portion of the encryption program shown in FIG. 7.

FIG. 10 is a table showing reception data C1 to Cl spooled by a reception data storage portion shown in FIG. 9.

FIG. 9) in a first method for decrypting encrypted data f(Mi, Ki).

FIG. 11) in the first method for decrypting the encrypted data f(Mi, Ki).

FIG. 9) in the second method for decrypting the encrypted data f(Mi, Ki).

FIG. 11) in the second method for decrypting the encrypted data f(Mi, Ki).

DETAILED DESCRIPTION OF THE PREFERRED EMBODIMENTS

An embodiment of the invention will be described below

Figure 1:
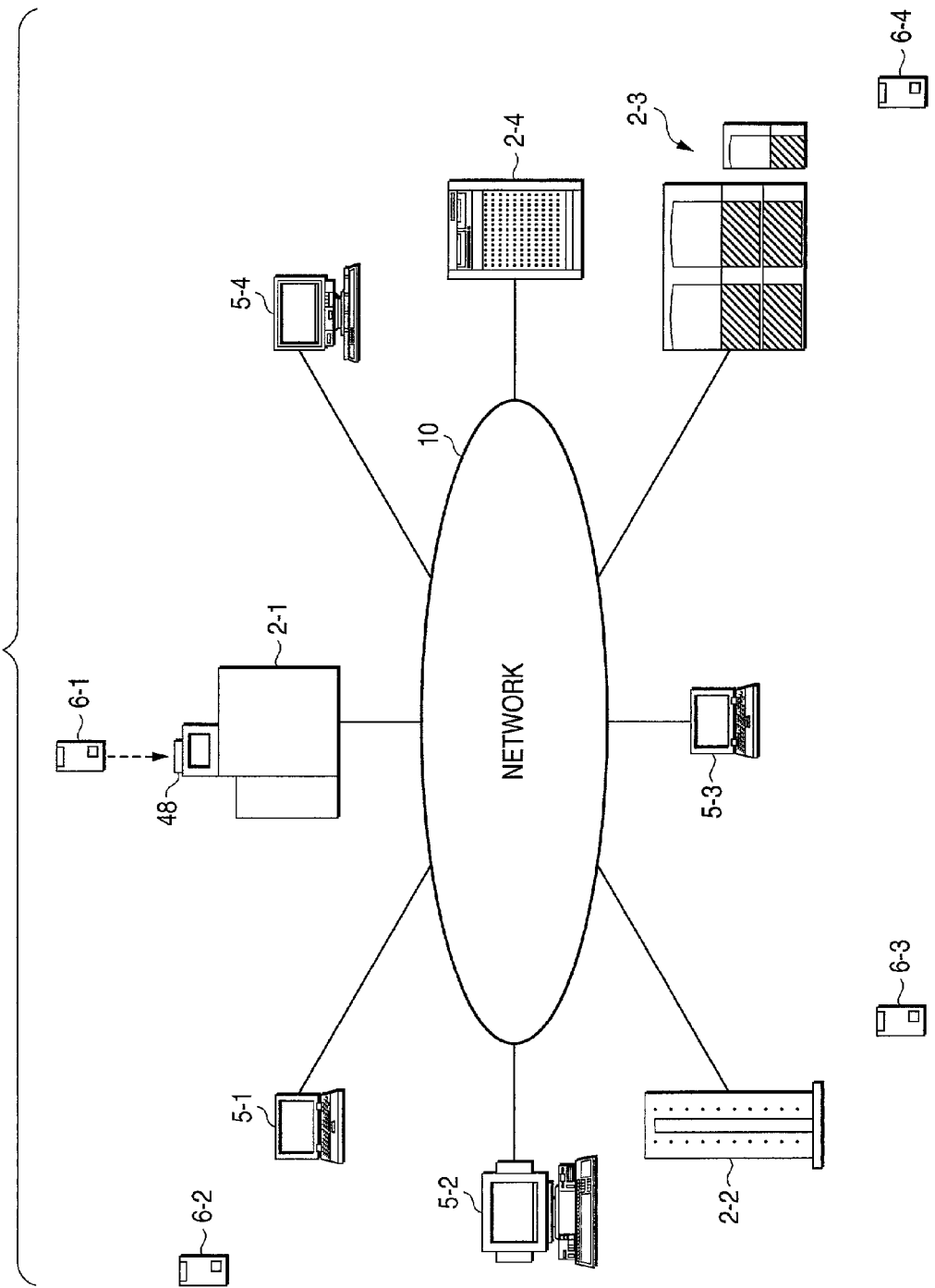
FIG. 1 is a view exemplarily showing the configuration of a network system to which an encryption/decryption method according to the invention is applied.

FIG. 1 is a view exemplarily showing the configuration of a network system 1 to which an encryption/decryption method according to the invention is applied.

As exemplarily shown in FIG. 1, the network system 1 has n pieces of server apparatus 2-1 to 2-n and m computers 5-1 to 5-m which are connected via a network 10 such as wide area network or LAN so as to transmit data to one another.

Further, the network system 1 includes k IC cards 6-1 to 6-k which can gain access to the pieces of server apparatus 2-1 to 2-n and the computers 5-1 to 5-m Incidentally, in the following description, the pieces of server apparatus 2-1 to 2-n, the computers 5-1 to 5-m and the IC cards 6-1 to 6-k will be occasionally noted down as nodes generically. In addition, any one of these pieces of apparatus, computers or cards that will be represented unspecified one will be occasionally noted down simply as server apparatus 2, computer 5 or IC card 6.

In addition, the signs k, m and n designate integers. FIG. 1 shows the case of k, m, n=4.

In addition, in the following description, the case where the server apparatus 2-1 is a complex copy machine 2-1 and the server apparatus 2-2 is a key administration server 2-2 will be taken as a specific example.

[Configuration of Hardware]

First, the hardware configurations of the server apparatus 2 (the complex copy machine 2-1 and the key administration server 2-2), the computer 5 and the IC card 6 of the network system 1 shown in FIG. 1 will be described.

[Complex Copy Machine 2-1]

Figure 2:
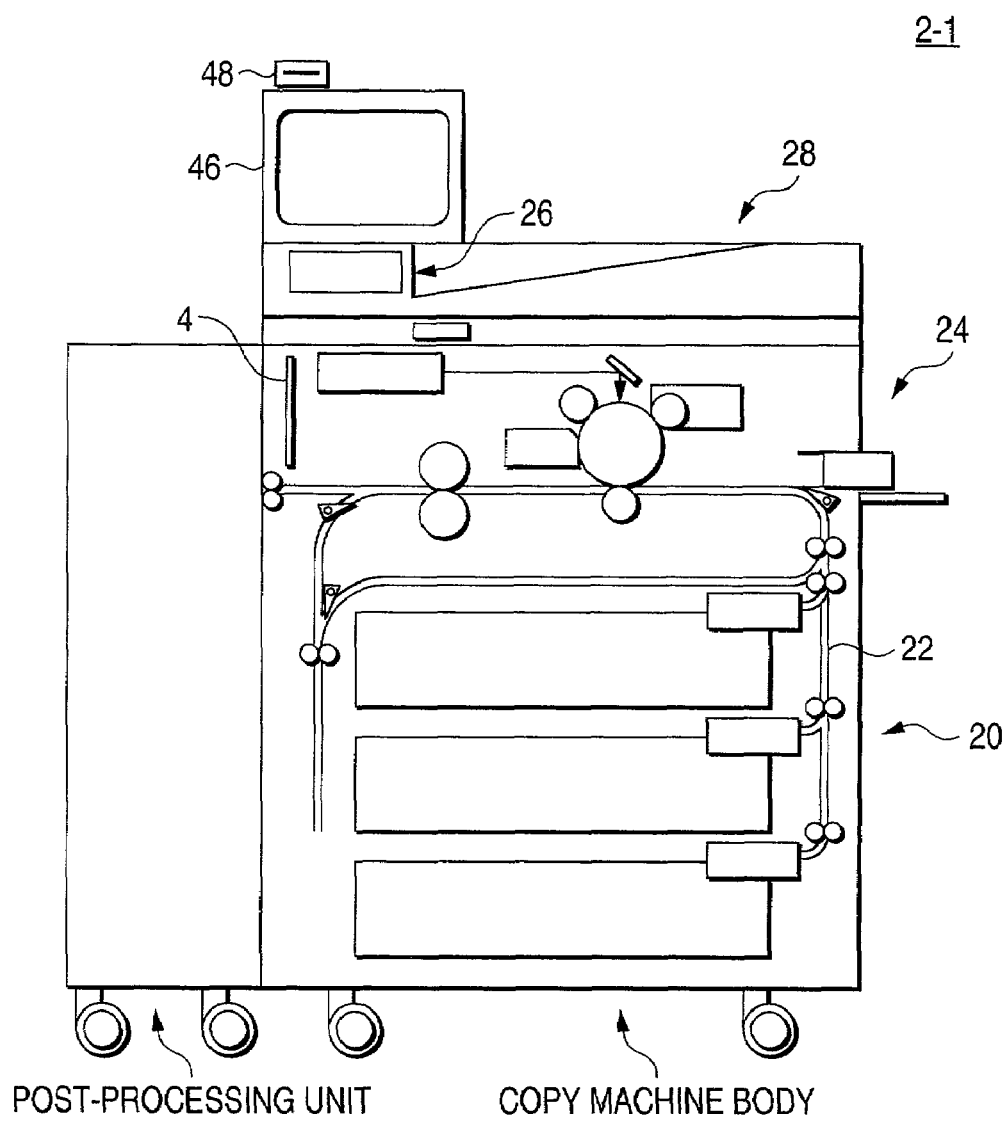
FIG. 2 is a view showing the configuration of a complex copy machine shown in FIG. 1.

FIG. 2 is a view showing the configuration of the complex copy machine 2-1 shown in FIG. 1.

Figure 3:
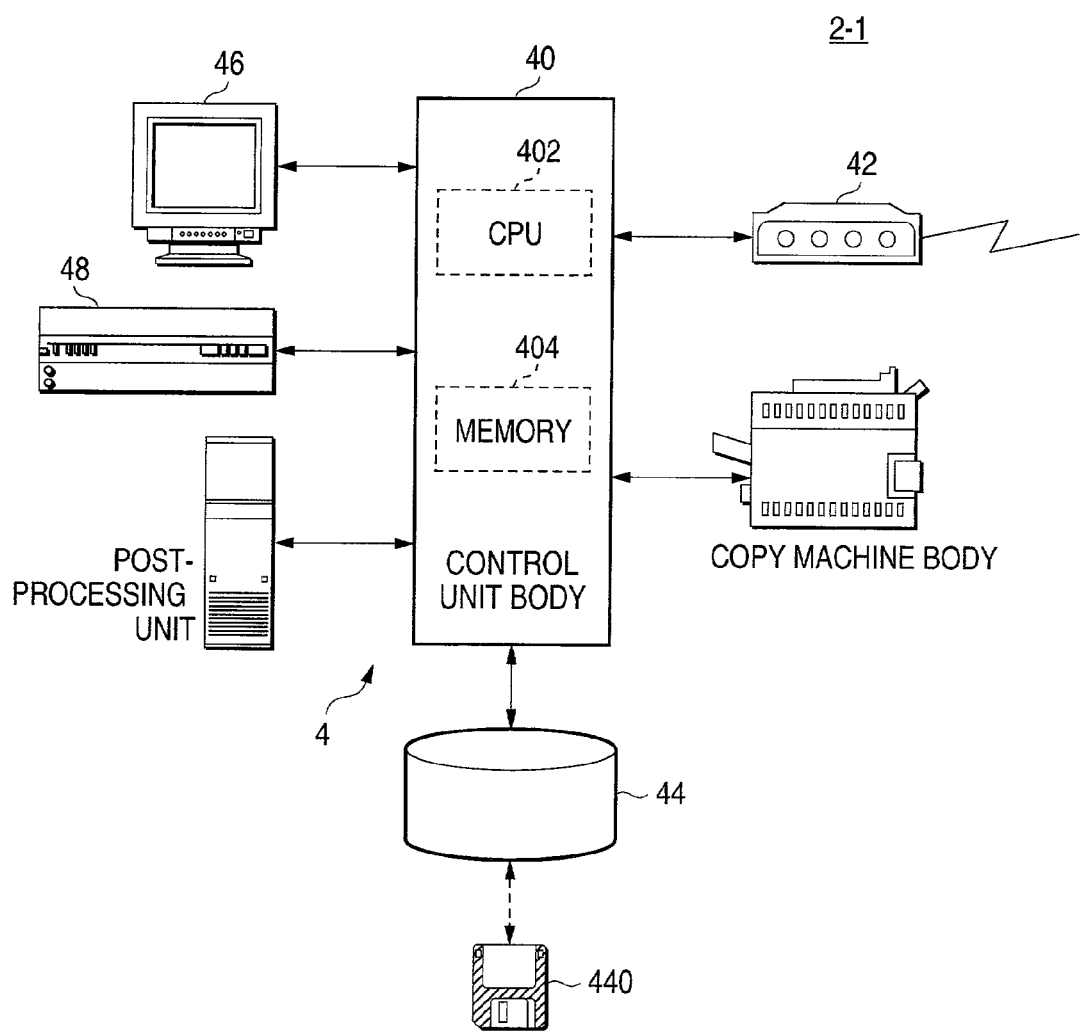
FIG. 3 is a view showing the configuration of the complex copy machine, focused on a control unit shown in FIG. 2.

FIG. 3 is a view showing the configuration of the complex copy machine 2-1, focused on a control unit 4 shown in FIG. 2.

As shown in FIG. 2, the complex copy machine 2-1 is constituted by a copy machine body and a post-processing unit. The copy machine body includes a copy paper tray portion 20, a paper feed unit 22, a print engine 24, a scanner 26, a document feed unit 28, etc.

The complex copy machine 2-1 uses these constituent portions to receive data through the network 10 and implement a function as a network printer for printing the received data and functions as a FAX, a scanner and a copy machine.

In addition, as shown in FIG. 3, the control unit 4 is constituted by a control unit body 40 including a CPU 402, a memory 404 and so on, a communication unit 42, a recording unit 44 such as a CD-ROM unit and an HDD unit, a display/input unit 46, and a PC card IF 48.

The control unit 4 uses these constituent portions to control the respective constituent portions of the complex copy machine 2-1 so as to implement these functions as a complex copy machine.

Further, the control unit 4 communicates with another node through the network 10, receives encrypted data from the node, and executes software for decryption as will be described later with reference to FIG. 9. Thus, the control unit 4 decrypts the received encrypted data in cooperation with the IC card 6 accepted by the PC card IF 48, and controls the copy machine body and so on, so as to print out the decrypted data.

[Communication Unit 42]

The communication unit 42 makes communication with another node on the network system 1 through the network 10.

[Display/Input Unit 46]

The display/input unit 46 is, for example, constituted by an LCD display unit and a touch panel or the like. Under the control of the control unit body 40, the display/input unit 46 displays a user interface image (UI image) for a user, and accepts an operation of the user on the UI image.

[PC Card IF 48]

The PC card IF 48 accepts the IC card and makes communication with the accepted IC card 6.

[Computer 5 and Key Administration Server 2-2]

Figure 4:
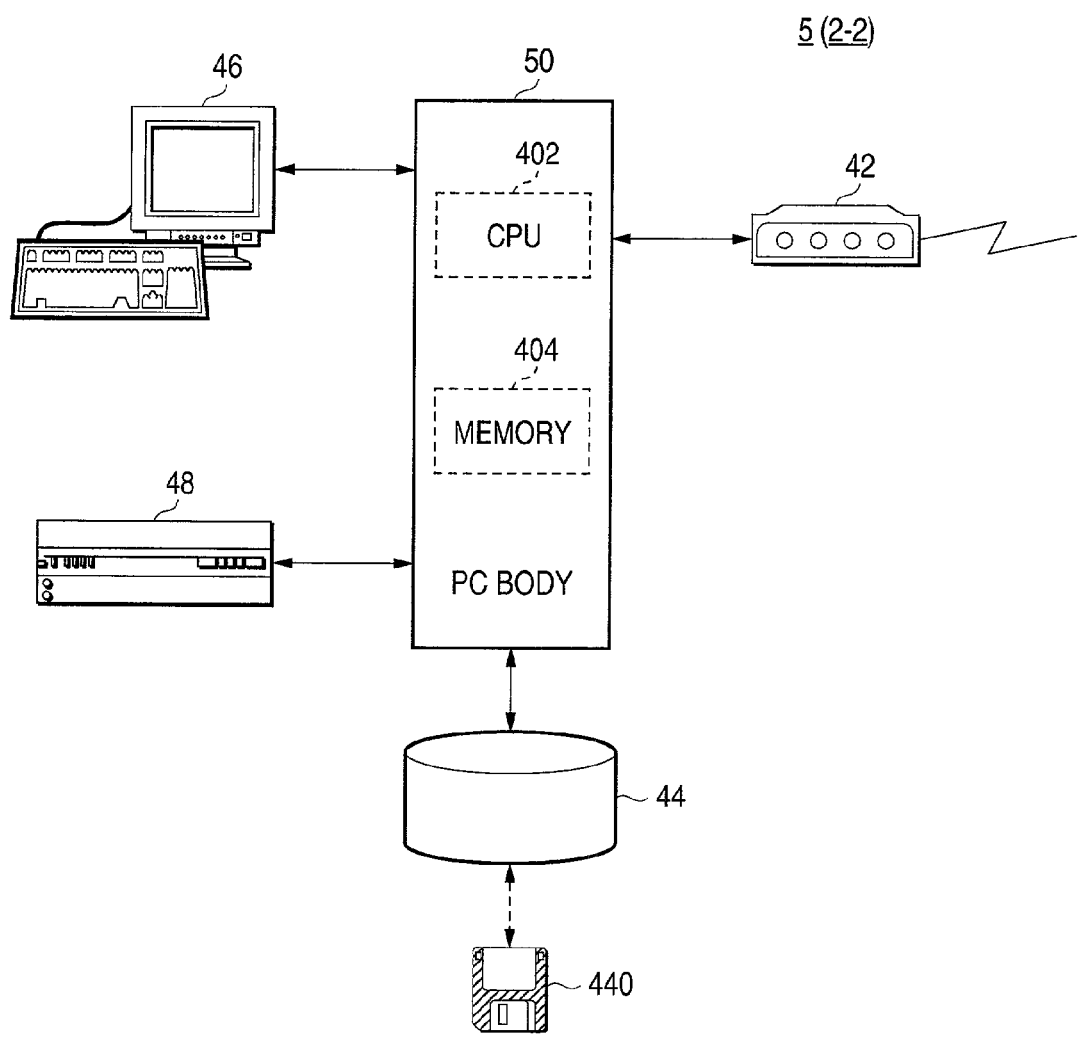
FIG. 4 is a view showing the configuration of a computer and a key administration server shown in FIG. 1.

FIG. 4 is a view showing the configuration of the computer 5 and the key administration server 2-2 shown in FIG. 1.

Incidentally, of the constituent portions shown in FIG. 4, members substantially the same as those of the complex copy machine 2-1 shown in FIG. 3 are referred to as the same numerals as those of the complex copy machine 2-1 shown in FIG. 3.

As shown in FIG. 4, each of the computer 5 and the key administration server 2-2 is constituted by a PC body 50 including a CPU 402, a memory 404 and so on, a communication unit 42, a recording unit 44, a display/input unit 46 including an LCD display unit or a CRT display unit and a keyboard, and a PC card IF 48, in the same manner as the control unit 4 (FIG. 3) of the complex copy machine 2-1.

That is, the computer 5 and the key administration server 2-2 include constituent portions as general computers which can make communication through a network.

[IC Card 6]

Figure 5:
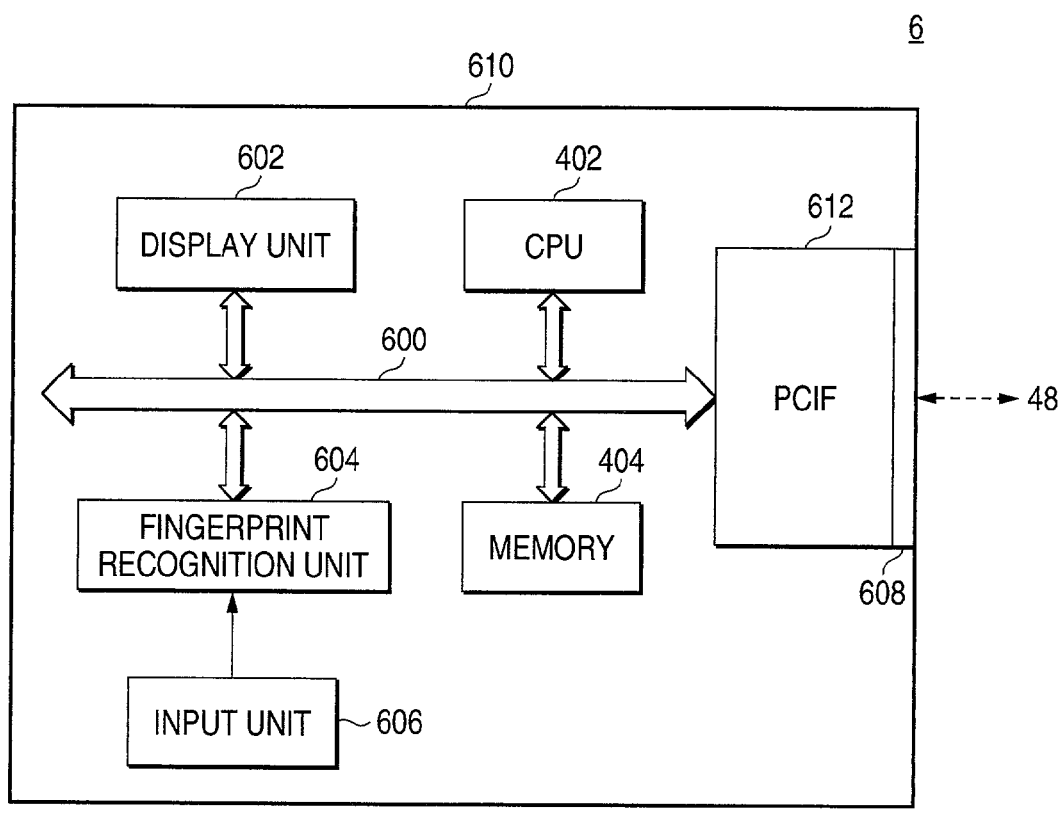
FIG. 5 is a diagram showing the configuration of the computer shown in FIG. 1.

FIG. 5 is a diagram showing the configuration of the computer 5 shown in FIG. 1.

Figure 6:
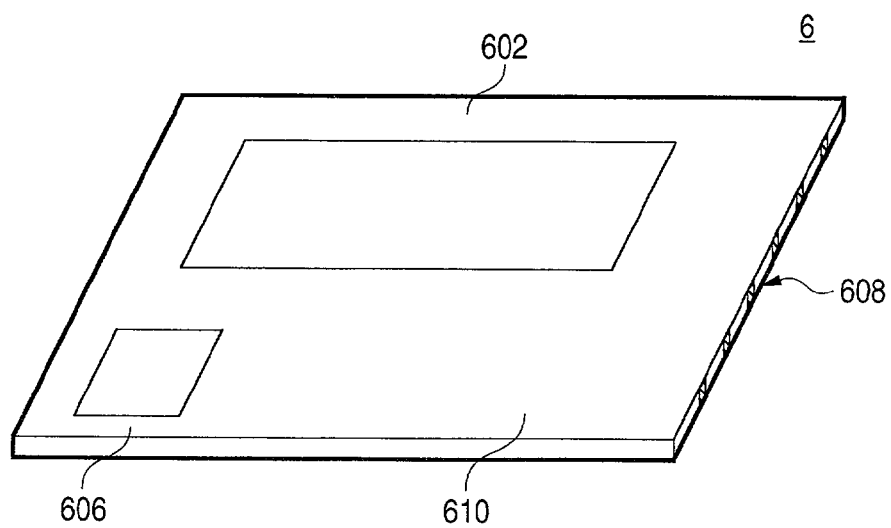
FIG. 6 is an outline view of an IC card shown in FIG. 5.

FIG. 6 is an outline view of the IC card 6 shown in FIG. 5.

Incidentally, of the constituent portions shown in FIG. 6, members substantially the same as those of the complex copy machine 2-1 (FIG. 3) and those of the computer 5 and the key administration server 2-2 (FIG. 4) are referred to as the same numerals as those of the complex copy machine 2-1 (FIG. 3) and those of the computer 5 and the key administration server 2-2 (FIG. 4).

The IC card 6 is, for example, a PC card compliant with the PCMCIA Standard, constituted by a CPU 402, a memory 404, a display unit 602, a fingerprint recognition unit 604, an input unit 606, a connector 608 and a PC interface 612, which are connected through a bus 600, as shown in FIG. 5.

That is, the IC card 6 has a configuration in which the display unit 602, the fingerprint recognition unit 604 and the input unit 606 have been added to a general PC card.

As shown in FIG. 6, those constituent portions of the IC card 6 are received in a case 610 so that a display surface of the display unit 602 and an input surface of the input unit 606 are exposed to the outside.

Incidentally, an area not readable but writable from the outside of the IC card is provided in the memory 404 of the IC card 6, and data such as a private key and a fingerprint is stored in this area.

The IC card 6 having such constituent portions is received in the PC card IF 48 (FIGS. 1 to 4) of the server apparatus 2 or the computer 5 and connected to the server apparatus 2 or the computer 5 through the connector 608 so that communication is made with such a node.

In addition the IC card 6 executes decryption software so as to decrypt encrypted data received by the complex copy machine 2-1 in cooperation with the complex copy machine 2-1 as will described later with reference to FIG. 11.

[Display Unit 602]

The display unit 602 is, for example, a small-size LCD display unit, which shows information to a user in accordance with necessity.

[Input Unit 606]

The input unit 606 is, for example, constituted by CCD devices or the like, so as to read a fingerprint of a user pressed against the input surface shown in FIG. 6, and supply the read fingerprint to the fingerprint recognition unit 604.

[Fingerprint Recognition Unit 604]

The fingerprint recognition unit 604 compares the fingerprint supplied from the input unit 606 with a fingerprint stored in the memory 404 in advance, and judges whether these fingerprints coincide with each other or not.

[PC Interface 612]

The PC interface 612 makes communication with the server apparatus 2 or the computer 5 through the connector 608 and the PC card IF 48.

[Software Configuration/Operation]

For example, description will be made below on the configuration and operation of each piece of software supplied to the server apparatus 2 and the computer 5 through the recording medium 440 (FIGS. 3 and 4), the network 10 (FIG. 1) or the like, or supplied to the IC card 6 through the PC card IF 48 (FIG. 4) of the computer 5 or the like, loaded in the memory 404 (FIGS. 3, 4 and 5) of such a node, and executed by the CPU 402.

[Encryption Program 500]

Figure 7:
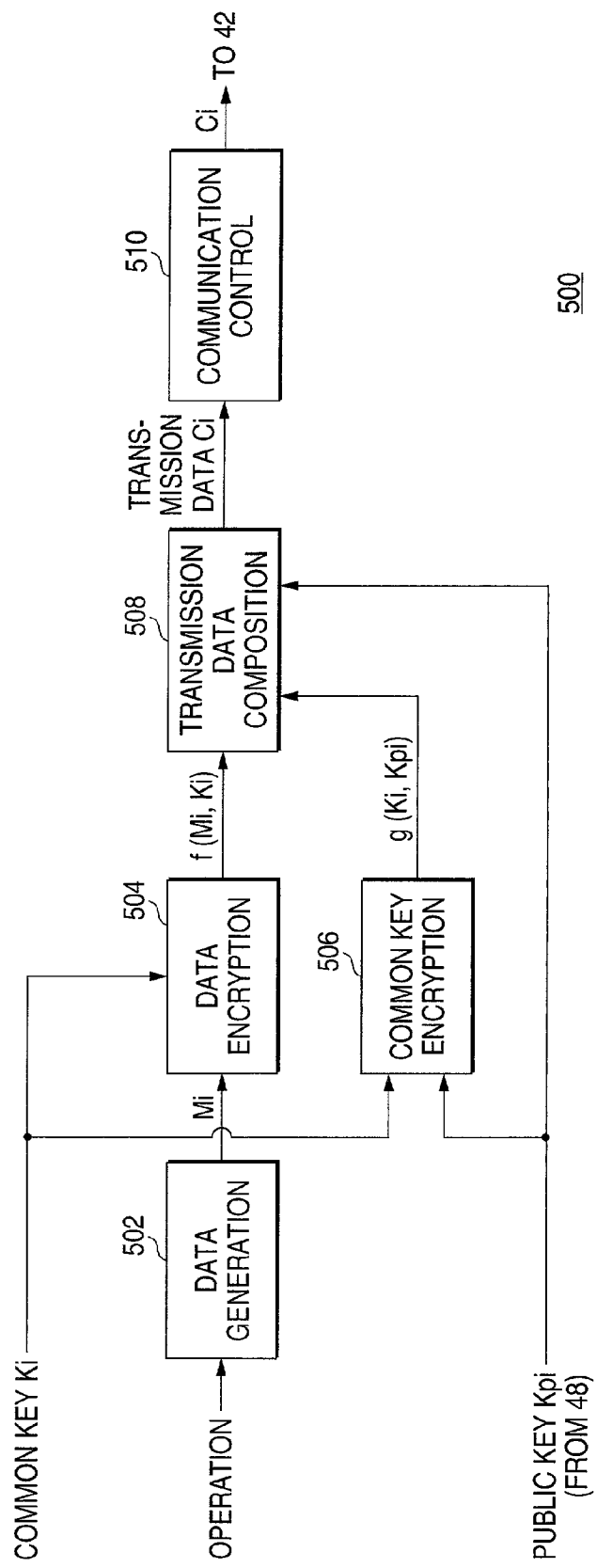
FIG. 7 is a diagram showing the configuration of an encryption program executed by the computer shown in FIGS. 1 and 4.

FIG. 7 is a diagram showing the configuration of an encryption program 500 executed by the computer 5 shown in FIGS. 1 and 4.

As shown in FIG. 7, the encryption program 500 is constituted by a data generation portion 502, a data encryption portion 504, a common key encryption portion 506, a transmission data composition portion 508 and a communication control portion 510.

The encryption program 500 is executed by each of the computers 5-1 to 5-$m$. However, FIG. 7 shows the case where the encryption program 500 is executed by one of these computers (computer 5-$i$; $1 \leq i \leq m$) by way of example.

The encryption program 500 uses these constituent portions to encrypt data Mi to be encrypted with a common key Ki, so as to generate encrypted data f(Mi, Ki).

In addition, the encryption program 500 encrypts the common key Ki with a public key Kpi supplied from the IC card 6 or the key administration server 2-2. The public key Kpi has been given to a user to whom the encrypted data is addressed. Thus, encrypted common key g(Ki, Kpi) is generated.

Further, the encryption program 500 associates the encrypted data f(Mi, Ki), the encrypted common key g(Ki, Kpi) and the public key Kpi with one another so as to generate transmission data Ci. The transmission data Ci is transmitted to the complex copy machine 2-1.

[Data Generation Portion 502]

The data generation portion 502 generates data Mi to be encrypted, such as text data or image data, in accordance with the operation of the user on the display/input unit 46 (FIG. 4). The generated data Mi is supplied to the data encryption portion 504.

[Data Encryption Portion 504]

The data encryption portion 504 encrypts the data Mi supplied from the data generation portion 502, for example, with a common key Ki set from the outside or generated automatically. Encrypted data f(Mi, Ki) generated thus is supplied to the transmission data composition portion 508.

[Common Key Encryption Portion 506]

The common key encryption portion 506 encrypts the common key Ki used for encryption in the data encryption portion 504, with a public key Kpi supplied from the IC card 6 received in the PC card IF 48 or from the key administration server 2-2 through the network 10. An encrypted common key g(Ki, Kpi) generated thus is supplied to the transmission data composition portion 508.

[Transmission Data Composition Portion 508]

FIG. 8 is a table showing a format of transmission data Ci generated by the transmission data composition portion 508 of the encryption program 500 shown in FIG. 7.

The transmission data composition portion 508 associates the encrypted data f(Mi, Ki) supplied from the data encryption portion 504, the encrypted common key g(Ki, Kpi) supplied from the common key encryption portion 506, and the public key Kpi used for generating the encrypted common key g(Ki, Kpi) with one another, as shown in FIG. 8. The transmission data Ci generated thus is supplied to the communication control portion 510.

Incidentally, the transmission data Ci in FIG. 8 has no direct relationship to reception data Ci which will be described later with reference to FIG. 10.

[Communication Control Portion 510]

The communication control portion 510 controls the communication unit 42 (FIG. 4) of the computer 5 so as to transmit the transmission data Ci supplied from the transmission data composition portion 508, to the complex copy machine 2-1.

[Decryption Program 200]

Figure 9:
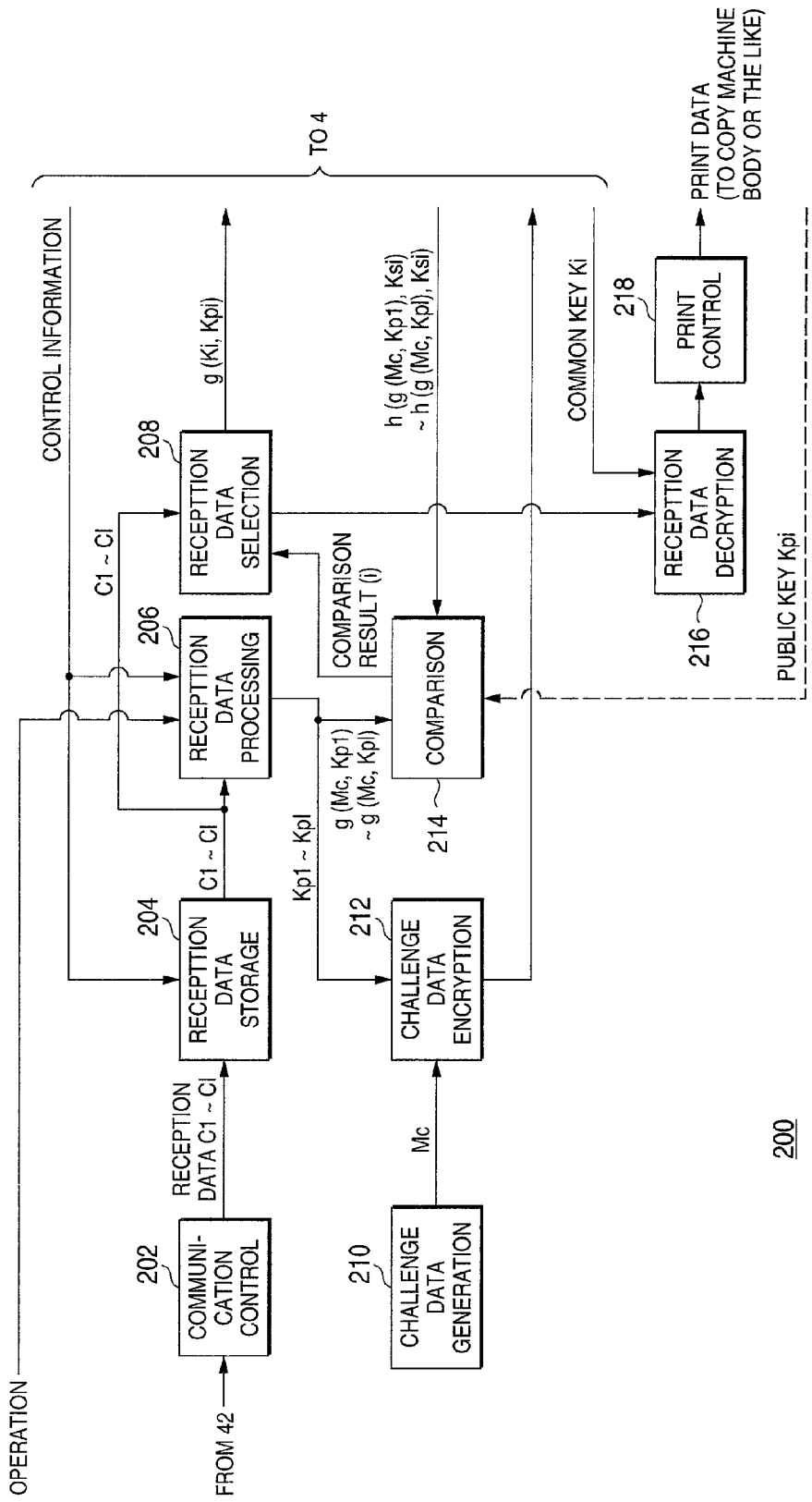
FIG. 9 is a diagram showing the configuration of a decryption program executed by the control unit of the complex copy machine shown in FIGS. 1 to 3.

FIG. 9 is a diagram showing the configuration of a decryption program 200 executed by the control unit 44 of the complex copy machine 2-1 shown in FIGS. 1 to 3.

As shown in FIG. 9, the decryption program 200 is constituted by a communication control portion 202, a reception data storage portion 204, a reception data processing portion 206, a reception data selection portion 208, a challenge data generation portion 210, a challenge data encryption portion 212, a comparison portion 214, a reception data decryption portion 216 and a print control portion 218.

The decryption program 200 uses these constituent portions to receive transmission data generated by the processing of the encryption program 500 (FIG. 7) of the computer 5 and transmitted to the complex copy machine 2-1. The received transmission data is formed as reception data Ci.

In addition, the decryption program 200 retrieves reception data Ci addressed to the user of the IC card 6 in cooperation with the IC card 6, and decrypts an encrypted common key g(Ki, Kpi) of the reception data Ci obtained as a result of the retrieval. Thus, a common key Ki is obtained.

Further, the decryption program 200 uses the decrypted common key Ki to decrypt encrypted data f(Mi, Ki), and controls the copy machine body (FIG. 2) of the complex copy machine 2-1 and so on, so as to print out data Mi obtained as a result of the decryption.

Incidentally, the following description on the respective constituent portions of the decryption program 200 will show the operation in a second method if there is no special note. The second method will be described later with reference to FIGS. 6 to 19.

In addition, the following description will show a specific example in which encrypted data f(Mi, Ki) addressed to a user of an IC card 6-$i$ is decrypted and outputted.

[Communication Control Portion 202]

The communication control portion 202 controls the communication unit 42 (FIG. 3) so as to make communication with the computer 5 through the network 10 (FIG. 1). Thus, transmission data C1 to Cl (FIG. 8) transmitted from the computers 5-1 to 5-$m$ (FIG. 1) is received and formed as reception data C1 to Cl respectively, and the reception data C1 to Cl is supplied to the reception data storage portion 204.

[Reception Data Storage Portion 204]

FIG. 10 is a table showing reception data C1 to Cl spooled by the reception data storage portion 204 shown in FIG. 9.

The reception data storage portion 204 spools and stores the reception data C1 to Cl supplied from the communication control portion 202 as shown in FIG. 10.

In addition, the reception data storage portion 204 supplies the stored reception data C1 to Cl to the reception data processing portion 206 and the reception data selection portion 208 in accordance with control information from the IC card 6-$i$ received in the PC card IF 48 (FIG. 4).

[Reception Data Processing Portion 206]

The reception data processing portion 206 processes the reception data C1 to Cl (FIG. 10) supplied from the reception data storage portion 204 in accordance with the operation of the user on the display/input unit 46 (FIG. 4) or the control information from the IC card 6-$i$, and supplies public keys Kp1 to Kpl included in the reception data C1 to Cl to the comparison portion 214 and the challenge data encryption portion 212 as shown by the dotted line.

[Challenge Data Generation Portion 210]

The challenge data generation portion 210, for example, generates a random number, and supplies the generated random number to the challenge data encryption portion 212.

In the following description, the random number generated by the challenge data generation portion 210 will be referred to as challenge data Mc.

[Challenge Data Encryption Portion 212]

The challenge data encryption portion 212 encrypts the challenge data Mc supplied from the challenge data generation portion 210 with the public keys Kp1 to Kpl supplied from the reception data processing portion 206, respectively, so as to generate encrypted challenge data g(Mc, Kp1) to g(Mc, Kpl). The encrypted challenge data g(Mc, Kp1) to g(Mc, Kpl) is supplied to the IC card 6-$i$ through the PC card IF 48.

[Comparison Portion 214]

In the first method which will be described later with reference to FIGS. 13 to 15, the comparison portion 214 compares the public key Kpi supplied from the IC card 6-$i$ through the PC card IF 48 (FIG. 8) with the public keys Kp1 to Kpl supplied from the reception data processing portion 206 as shown by the dotted line in the drawings. Thus, the comparison portion 214 judges whether any one of the public keys Kp1 to Kpl coincides with the public key Kpi, and supplies a comparison result (i) to the reception data selection portion 208.

Alternatively, in the second method which will be described later with reference to FIGS. 16 to 19, the comparison portion 214 compares the public keys Kp1 to Kpl supplied from the reception data processing portion 206 with decrypted challenge data h(g(Mc, Kp1), Ks1) to h(g(Mc, Kpl), Ksl) supplied from the IC card 6-$i$ through the PC card IF 48. Thus, the comparison portion 214 judges whether any one of the decrypted challenge data h(g(Mc, Kp1), Ks1) to h(g(Mc, Kpl), Ksl) coincides with the challenge data Mc, and supplies a comparison result (i) to the reception data selection portion 208.

Incidentally, as will be described late with reference to FIG. 11, the decrypted challenge data h(g(Mc, Kp1), Ks1) to h(g(Mc, Kpl), Ksl) is generated in the IC card 6-$i$ by decrypting the encrypted challenge data g(Mc, Kp1) to g(Mc, Kpl) generated by the challenge data encryption portion 212 with a private key Ksi set in the IC card 6-$i$, respectively.

Accordingly, as can be understood easily, only the decrypted challenge data h(g(Mc, Kpi), Ksi) obtained by decrypting the encrypted challenge data g(Mc, Kpi) with the private key Ksi corresponding to the public key Kpi is decrypted correctly into the original challenge data Mc.

Accordingly, the comparison portion 214 supplies a comparison result designating the reception data Ci shown in FIG. 10 to the reception data selection portion 208 in the specific example shown here.

[Reception Data Selection Portion 208]

The reception data selection portion 208 selects, from the reception data C1 to Cl (FIG. 10) supplied from the reception data storage portion 204, reception data Ci designated by the comparison result (i) supplied from the comparison portion 214. Thus, an encrypted common key g(Ki, Kpi) included in this reception data Ci is supplied to the IC card 6-$i$ through the PC card IF 48 (FIG. 4) while the encrypted data f(Mi, Ki) is supplied to the reception data decryption portion 216.

[Reception Data Decryption Portion 216]

The reception data decryption portion 216 decrypts the encrypted data f(Mi, Ki) supplied from the reception data selection portion 208 with a common key Ki supplied from the IC card 6-$i$ through the PC card IF 48. Data Mi obtained thus is supplied to the print control portion 218.

Figure 11:
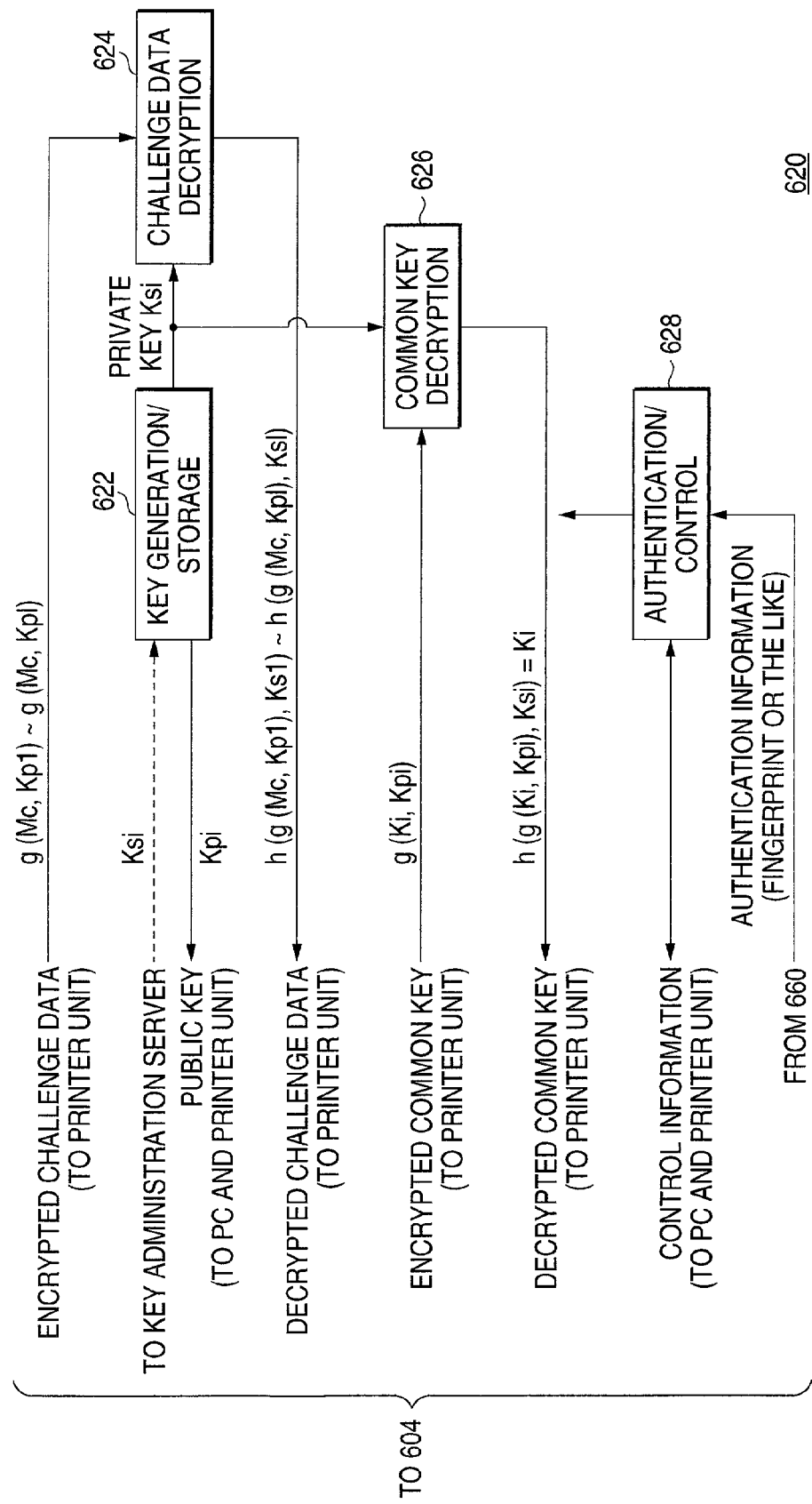
FIG. 11 is a diagram showing the configuration of a common key decryption program executed by the IC card shown in FIG. 5.

Incidentally, the common key Ki used for decryption in the reception data decryption portion 216, which will be described later with reference to FIG. 11, is generated by the IC card 6-$i$ decrypting the encrypted common key g(Ki, Kpi) supplied to the IC card 6-$i$ through the PC card IF 48 from the reception data selection portion 208.

[Print Control Portion 218]

The print control portion 218 controls the copy machine body (FIG. 2) of the complex copy machine 2-1 so as to print the data Mi supplied from the reception data decryption portion 216.

[Common Key Decryption Program 620]

FIG. 11 is a diagram showing the configuration of a common key decryption program 620 executed by the IC card 6 shown in FIG. 5.

Incidentally, the common key decryption program 620 is executed by each of the IC cards 6-1 to 6-$k$. However, the following description shows a specific example in which the common key decryption program 620 is executed by an IC card 6-$i$ ($1 \leq i \leq k$) used by the user to whom the reception data Ci shown in FIG. 10 is addressed.

As shown in FIG. 11, the common key decryption program 620 is constituted by a key generation/storage portion 622, a challenge data decryption portion 624, a common key decryption portion 626 and an authentication/control portion 628.

The common key decryption program 620 uses these constituent portions to judge whether the user of the IC card 6-$i$ is a legitimate user of the IC card 6-$i$ or not. Only when the user is authenticated as a legitimate user, the common key decryption program 620 decrypts an encrypted common key g(Ki, Kpi) with a private key Ksi in cooperation of the complex copy machine 2-1. The private key Ksi is generated by the common key decryption program 620 itself, or set by the key administration server 2-2 as will be described later with reference to FIG. 12.

Incidentally, the following description on the respective constituent portions of the common key decryption program 620 will show the operation in the second method if there is no special note. The second method will be described later with reference to FIGS. 16 to 19.

[Authentication/Control Portion 628]

The authentication/control portion 628 activates the constituent portions of the common key decryption program 620 only when the fingerprint recognition unit 604 judges the fingerprint of the user of the IC card 6-$i$ read by the input unit 606 to be a fingerprint of a legitimate user of the IC card 6-$i$. Then, the authentication/control portion 628 makes the constituent portions of the common key decryption program 620 carry out decryption processing of the encrypted common key g(Ki, Kpi) in cooperation with the complex copy machine 2-1 (the decryption program 200; FIG. 9).

In addition, the authentication/control portion 628 supplies control information such as a print request to the complex copy machine 2-1 (the decryption program 200; FIG. 9) when the IC card 6 is received in the PC card IF 48 (FIG. 3) of the complex copy machine 2-1.

[Key Generation/Storage Portion 622]

In the first method which will be described later with reference to FIGS. 13 to 15, the key generation/storage portion 622 uses a random number or the like to generate a public key Kpi and a private key Ksi for the IC card 6-$i$. The public key Kpi is supplied to the computer 5 transmitting transmission data Ci addressed to the user of the IC card 6-$i$, and the complex copy machine 2-1, while the private key Ksi is supplied to the common key decryption portion 626.

In the second method which will be described later with reference to FIGS. 16 to 19, the key generation/storage portion 622 stores a public key Kpi set for the IC card 6-$i$ by the key administration server 2-2. The stored public key Kpi is supplied to the challenge data decryption portion 624 and the common key decryption portion 626.

Here, note that the private key Ksi is not supplied from the IC card 6-$i$ to the outside in either the first method or the second method.

[Challenge Date Decryption Portion 624]

The challenge data decryption portion 624 decrypts encrypted challenge data g(Mc, Kp1) to g(Mc, Kpl) supplied from the complex copy machine 2-1 (the challenge data encryption portion 212 of the decryption program 200; FIG. 9) with the private key Ksi supplied from the key generation/storage portion 622. Decrypted challenge data h(g(Mc, Kp1), Ks1) to h(g(Mc, Kpl), Ksl) obtained thus is supplied to the complex copy machine 2-1 (the comparison portion 214 of the decryption program 200).

[Common Key Decryption Portion 626]

The common key decryption portion 626 decrypts the encrypted common key g(Ki, Kpi) supplied from the complex copy machine 2-1 (the reception data selection portion 208 of the decryption program 200; FIG. 9) with the private key Ksi supplied from the key generation/storage portion 622. A common key Ki obtained thus is supplied to the complex copy machine 2-1 (the reception data decryption portion 216 of the decryption program 200).

[Key Administration Program 240]

Figure 12:
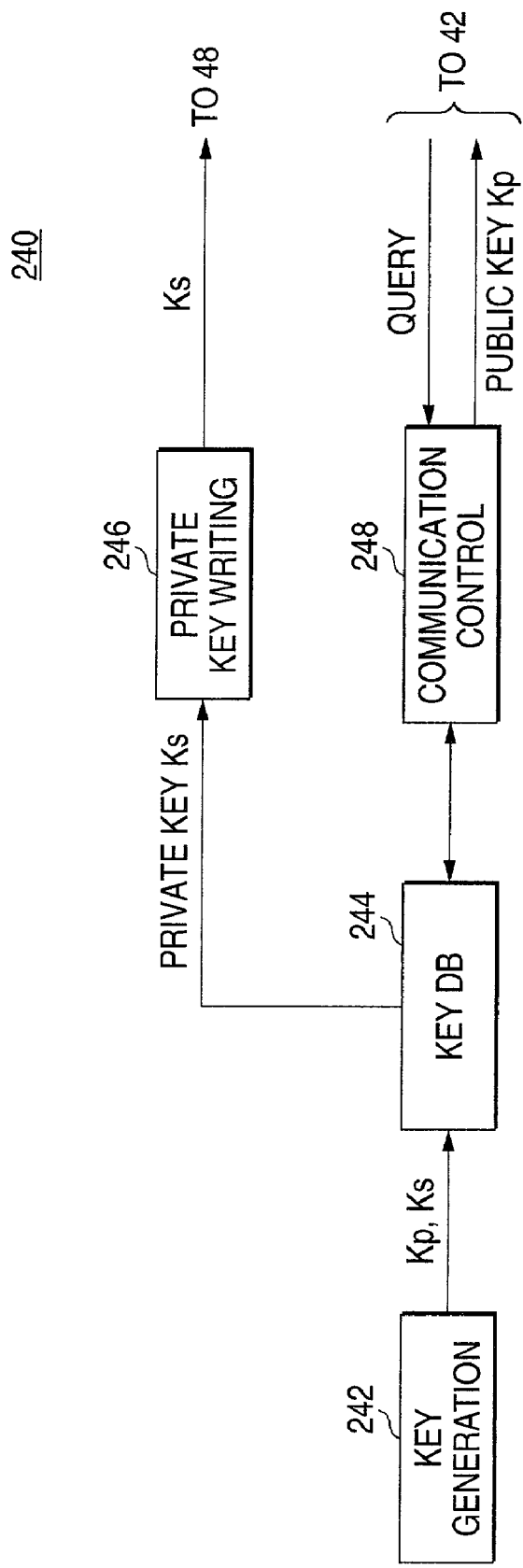
FIG. 12 is a diagram showing the configuration of a key administration program executed by the key administration server shown in FIGS. 1 and 4.

FIG. 12 is a diagram showing the configuration of a key administration program 240 executed by the key administration server 2-2 shown in FIGS. 1 and 4.

As shown in FIG. 12, the key administration program 240 is constituted by a key generation portion 242, a key database (key DB) 244, a private key writing portion 246 and a communication control portion 248.

The key administration program 240 uses these constituent portions to generate, store and administer private keys Ks1 to Ksk and public keys Kp1 to Kpk given to users of the network system 1 and set for the IC cards 6-1 to 6-$k$ respectively in the second method which will be described later with reference to FIGS. 16 to 19.

In addition, the key administration program 240 notifies the computer 5 of a public key for a destination of encrypted data in response to a query from the computer 5 (the encryption program 500; FIG. 7).

In addition, the key administration program 240 sets, for the IC card 6 (the common key decryption program 620), a private key which will be used for decryption of data addressed to the user of the IC card 6.

Incidentally, the following description will show a specific example in which the key administration program 240 notifies the computer 5 of a public key Kpi to be used for encryption of data addressed to a user of an IC card 6-$i$ in response to a query from the computer 5, and sets a private key Ksi to be used for decryption of data addressed to the user of the IC card 6-$i$.

[Key Generation Portion 242]

The key generation portion 242 uses these constituent portions to generate private keys Ks1 to Ksk and public keys Kp1 to Kpk given to users of the network system 1 and set for the IC cards 6-1 to 6-$k$ respectively in the second method which will be described later with reference to FIGS. 16 to 19. The generated private keys Ks1 to Ksk and public keys Kp1 to Kpk are supplied to the key DB 244.

[Communication Control Portion 248]

The communication control portion 248 controls the communication unit 42 (FIG. 4) so as to make communication with the computer 5 through the network 10 (FIG. 1). Thus, a query about a public key Kpi from the computer 5 is supplied to the key DB 244, and the public key Kpi supplied from the key DB 244 is supplied to the computer 5 making the query.

[Private Key Writing Portion 246]

The private key writing portion 246 makes a request to the key DB 244 for a private key Ksi to be set for the IC card 6-$i$ when the IC card 6-$i$ is received in the PC card IF 48 (FIG. 4).

In addition, the private key writing portion 246 sets the private key Ksi supplied from the key DB 244 in response to the request, for the IC card 6-$i$ (the key generation/storage portion 622 of the common key decryption program 620; FIG. 11).

[Key DB 244]

The key DB 244 stores and administers the public keys and the private keys supplied from the key generation portion 242.

In addition, the key DB 244 retrieves a stored public key in response to a query from the computer 5 through the communication control portion 248, and supplies the public key Kpi obtained as a result of the retrieval to the communication control portion 248. The public key Kpi will be used for encryption of data addressed to the user of the IC card 6-$i$.

In addition, the key DB 244 retrieves a stored private key in response to a request of the private key writing portion 246. The private key Ksi of the IC card 6-$i$ obtained as a result of the retrieval is supplied to the private key writing portion 246.

[First Method]

The first method in which the IC card 6-$i$ and the complex copy machine 2-1 cooperates with each other in decrypting encrypted data f(Mi, Ki) will be described below with reference to FIGS. 13 to 15.

Figure 13:
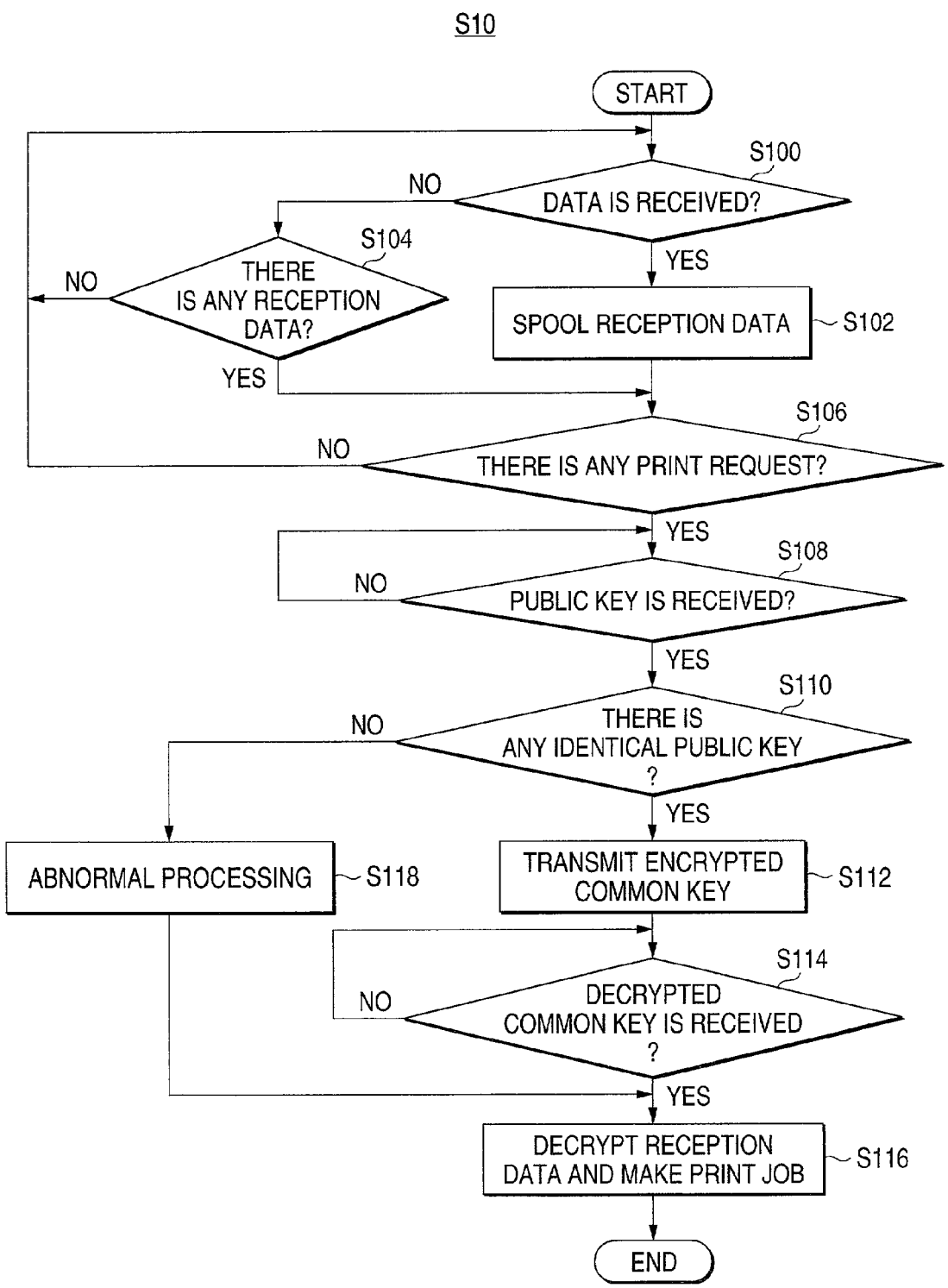
FIG. 13 is a flow chart showing the operation (S10) of the complex copy machine (the decryption program.

FIG. 13 is a flow chart showing the operation (S10) of the complex copy machine 2-1 (the decryption program 200; FIG. 9) in the first method for decrypting the encrypted data f(Mi, Ki).

Figure 14:
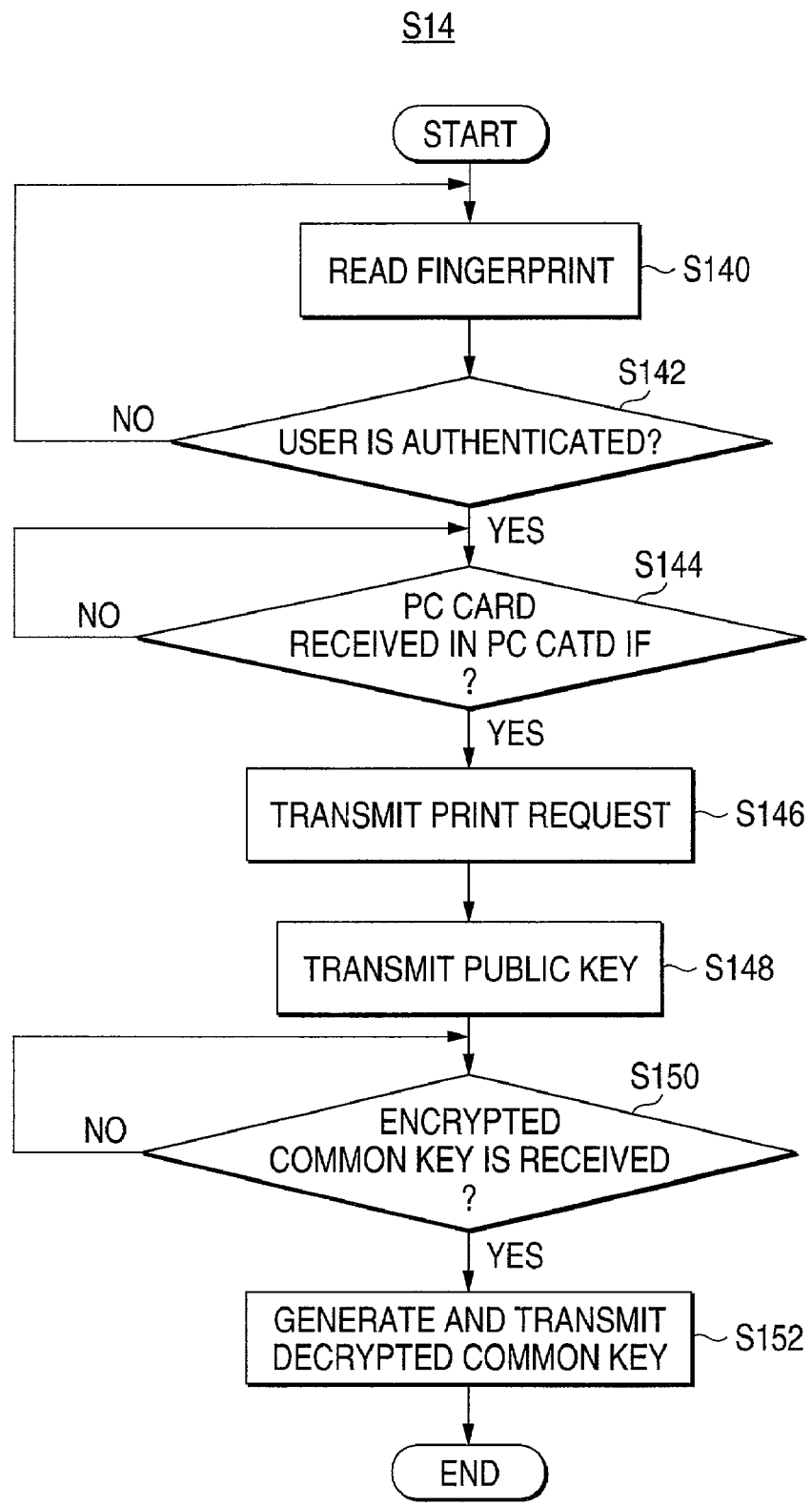
FIG. 14 is a flow chart showing the operation (S14) of the IC card (the common key decryption program.

FIG. 14 is a flow chart showing the operation (S14) of the IC card 6-$i$ (the common key decryption program 620; FIG. 11) in the first method for decrypting the encrypted data f(Mi, Ki).

Figure 15:
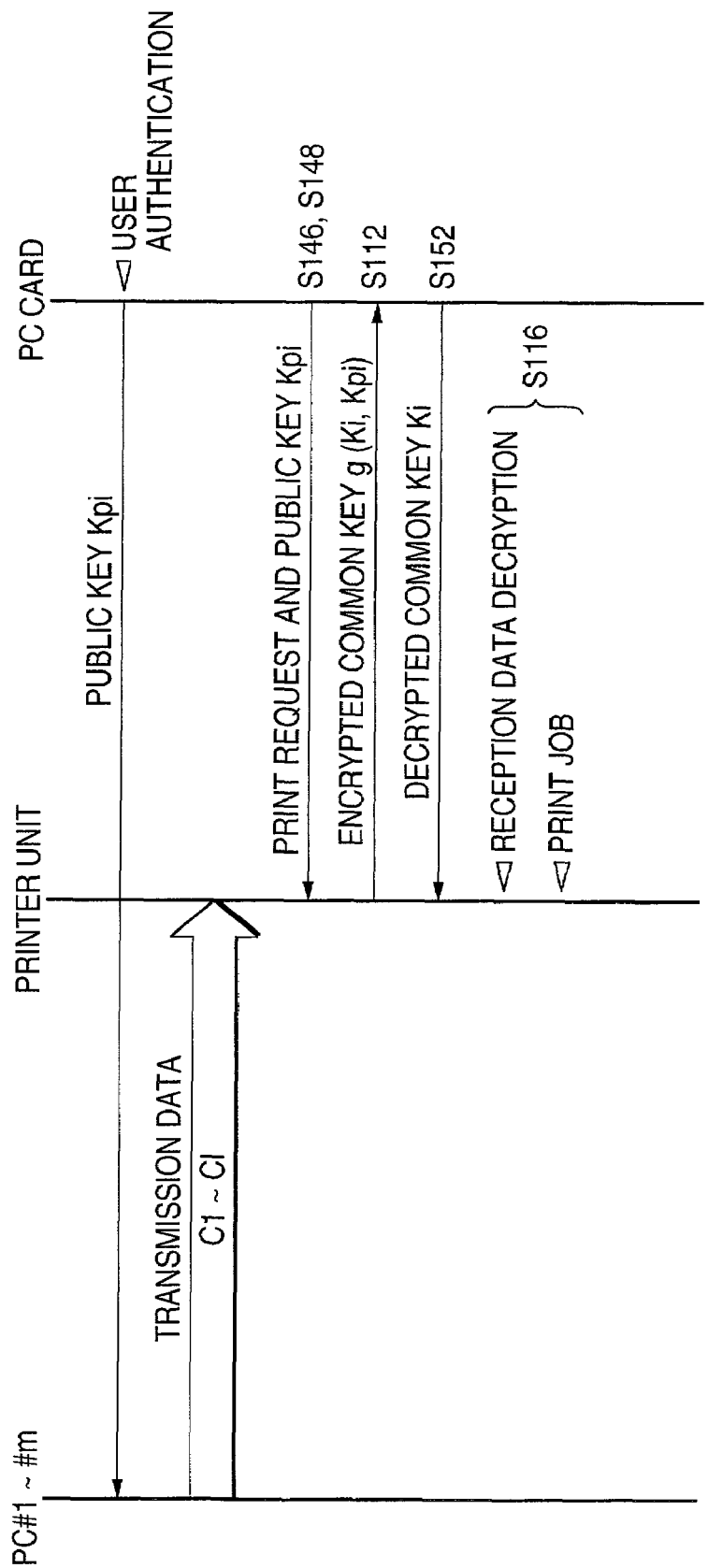
FIG. 15 is a diagram showing a signal sequence among the computers, the complex copy machine and the IC card in the first method for decrypting the encrypted data f(Mi, Ki).

FIG. 15 is a diagram showing a signal sequence among the computers 5-1 to 5-$m$, the complex copy machine 2-1 and the IC card 6-$i$ in the first method for decrypting the encrypted data f(Mi, Ki).

Incidentally, in the first method, a private key Ksi and a public key Kpi are generated inside the IC card 6-$i$ (the common key decryption program 620; FIG. 11). The public key Kpi is supplied from the IC card 6-$i$ to the complex copy machine 2-1 (the decryption program 200; FIG. 9) so that reception data Ci is retrieved with the public key Kpi in the complex copy machine 2-1.

[Operation of Complex Copy Machine 2-1 in First Method]

First, the operation of the complex copy machine 2-1 (the decryption program 200; FIG. 9) in the first method will be described with reference to FIG. 13.

As shown in FIG. 13, in Step 100 (S100), the communication control portion 202 (FIG. 9) of the decryption program 200 executed by the control unit 4 (FIG. 3) of the complex copy machine 2-1 judges whether transmission data (FIG. 8) has been received from the computer 5 or not.

The decryption program 200 advances to the processing of S102 when transmission data has been received, or advances to the processing of S104 otherwise.

In Step 102 (S102), the communication control portion 202 supplies the received transmission data to the reception data storage portion 204 in the form of reception data. The reception data storage portion 204 spools the reception data supplied from the communication control portion 202 as shown in FIG. 10.

In Step 104 (S104), the reception data storage portion 204 judges whether the reception data has been spooled or not.

The decryption program 200 advances to the processing of S106 when the reception data has been spooled, or returns to the processing of S100 otherwise.

In Step 106 (S106), the reception data storage portion 204 judges whether a print request has been issued as control information from the IC card 6-$i$ received in the PC card IF 48 (FIG. 3) or not.

The decryption program 200 advances to the processing of S108 when a print request has been issued from the IC card 6-$i$, or returns to the processing of S100 otherwise.

In Step 108 (S108), the comparison portion 214 judges whether a public key Kpi has been received from the IC card 6-$i$ or not.

The decryption program 200 advances to the processing of S110 when the public key Kpi has been received, or stays in the processing of S108 otherwise.

In Step 110 (S110), the reception data processing portion 206 extracts public keys Kp1 to Kpl from the reception data C1 to Cl (FIG. 10) and supplies the public keys Kp1 to Kpl to the comparison portion 214.

The comparison portion 214 compares the public key Kpi received from the IC card 6-$i$ with the public keys Kp1 to Kpl supplied from the reception data processing portion 206, and judges whether there is a public key coinciding with the public key Kpi supplied from the IC card 6-$i$ or not.

The decryption program 200 advances to the processing of S112 when any one of the public keys Kp1 to Kpl coincides with the public key Kpi, or advances to the processing of S118 otherwise so that abnormal processing such as displaying a message on the display unit 602 of the IC card 6-$i$ is carried out.

In Step 112 (S112), the comparison portion 214 supplies a comparison result i to the reception data selection portion 208. The reception data selection portion 208 selects reception data Ci (FIG. 10) corresponding to the comparison result i, and transmits an encrypted common key g(Ki, Kpi) included in the reception data Ci to the IC card 6-*i*.

In Step 114 (S114), the reception data decryption portion 216 judges whether a decrypted common key Ki (=h(g(Ki, Kpi), Ksi)) has been received from the IC card 6-*i* or not.

The decryption program 200 advances to the processing of S116 when the decrypted common key Ki has been received, or stays in the processing of S114 otherwise.

In Step 116 (S116), the reception data decryption portion 216 uses the received decrypted common key Ki to decrypt the encrypted data f(Mi, Ki) of the reception data Ci and supply original data Mi obtained thus to the print control portion 218.

The print control portion 218 controls the copy machine body (FIG. 2) and so on, so as to print the data Mi supplied from the reception data decryption portion 216.

[Operation of IC Card 6-*i* in First Method]

Next, the operation of the IC card 6-*i* (the common key decryption program 620; FIG. 11) in the first method will be described with reference to FIG. 14.

First, the key generation/storage portion 622 of the common key decryption program 620 executed by the IC card 6-*i* generates and stores a public key Kpi and a private key Ksi for the IC card 6-*i*.

In Step 140 (S140), the authentication/control portion 628 controls the input unit 606 (FIG. 5) so as to read a fingerprint of a user pressed against the input surface thereof.

In Step 142 (S142), the authentication/control portion 628 judges whether the fingerprint read by the input unit 606 has been recognized as a fingerprint of a legitimate user of the IC card 6-*i* by the fingerprint recognition unit 604 or not.

The common key decryption program 620 authenticates the user as the legitimate user of the IC card 6-*i* and advances to the processing of S144 when the input fingerprint is recognized as the fingerprint of the legitimate user. Otherwise, the common key decryption program 620 returns to the processing of S140.

In Step 144 (S144), the authentication/control portion 628 judges whether the IC card 6-*i* has been received in the PC card IF 48 (FIG. 4) of the complex copy machine 2-1.

The common key decryption program 620 advances to the processing of S146 when the IC card 6-*i* has been received in the PC card IF 48, or stays in the processing of S144 otherwise.

In Step 146 (S146), the authentication/control portion 628 transmits a print request to the complex copy machine 2-1.

In Step 148 (S148), the key generation/storage portion 622 transmits the stored public key Kpi to the complex copy machine 2-1.

In Step 150 (S150), the common key decryption portion 626 judges whether an encrypted common key g(Ki, Kpi) has been received from the complex copy machine 2-1 or not.

The common key decryption program 620 advances to the processing of S152 when the encrypted common key g(Ki, Kpi) has been received, or stays in the processing of S150 otherwise.

In Step 152 (S152), the common key decryption portion 626 decrypts the received encrypted common key g(Ki, Kpi) with the private key Ksi supplied from the key generation/storage portion 622 so as to generate a decrypted public key Kpi. The decrypted public key Kpi is transmitted to the complex copy machine 2-1.

[Total Operation of Network System 1 in First Method]

Further, the total operation of the network system 1 in the first method will be described further with reference to FIG. 15.

First, as described previously with reference to FIG. 7, transmission data Ci is generated in the computer 5 and transmitted to the complex copy machine 2-1 through the network 10 (FIG. 1).

That is, as shown in FIG. 15, first, the IC card 6-*i* authenticates a user by fingerprint.

In addition, a public key Kpi is set for the computer 5 in advance from the IC card 6-*i* received in the PC card IF 48 (FIG. 4) of the computer 5.

The data generation portion 502 (FIG. 7) of the encryption program 500 executed by the computer 5 generates data Mi in accordance with the operation of the user or the like. The data encryption portion 504 encrypts the data Mi with a common key Ki so as to generate encrypted data f(Mi, Ki).

The common key encryption portion 506 encrypts the common key Ki with the public key Kpi so as to generate an encrypted common key g(Ki, Kpi). The transmission data composition portion 508 associates the encrypted data f(Mi, Ki) supplied from the data encryption portion 504, the encrypted common key g(Ki, Kpi) supplied from the common key encryption portion 506, and the public key Kpi used for creating the encrypted common key g(Ki, Kpi) as shown in FIG. 8. Thus, transmission data Ci is generated.

The communication control portion 510 controls the communication unit 42 (FIG. 4) of the computer 5 so as to transmit the transmission data Ci to the complex copy machine 2-1 through the network 10.

When transmission data C1 to Cl is transmitted from the computers 5-1 to 5-*m* to the complex copy machine 2-1 respectively as shown in FIG. 15, the complex copy machine 2-1 receives the transmission data C1 to Cl and spools the transmission data C1 to Cl in the form of reception data C1 to Cl as shown in FIG. 10.

When the IC card 6-*i* received in the PC card IF 48 (FIG. 3) of the complex copy machine 2-1 transmits a print request and a public key Kpi to the complex copy machine 2-1 (S146 and S148; FIG. 14), the complex copy machine 2-1 searches reception data Ci addressed to the user of the IC card 6-*i* by use of the public key Kpi, extracts an encrypted common key g(Ki, Kpi) from the reception data Ci, and supplies the encrypted common key g(Ki, Kpi) to the IC card 6-*i* (S112; FIG. 13).

When the IC card 6-*i* feeds back a decrypted common key Ki to the complex copy machine 2-1 (S152; FIG. 14), the complex copy machine 2-1 decrypts the encrypted data f(Mi, Ki) by use of the decrypted common key Ki and makes a print job (S116; FIG. 13).

[Second Method]

The second method in which the IC card 6-*i* and the complex copy machine 2-1 cooperate with each other in decrypting encrypted data f(Mi, Ki) will be described below with reference to FIGS. 16 to 19.

Figure 16:
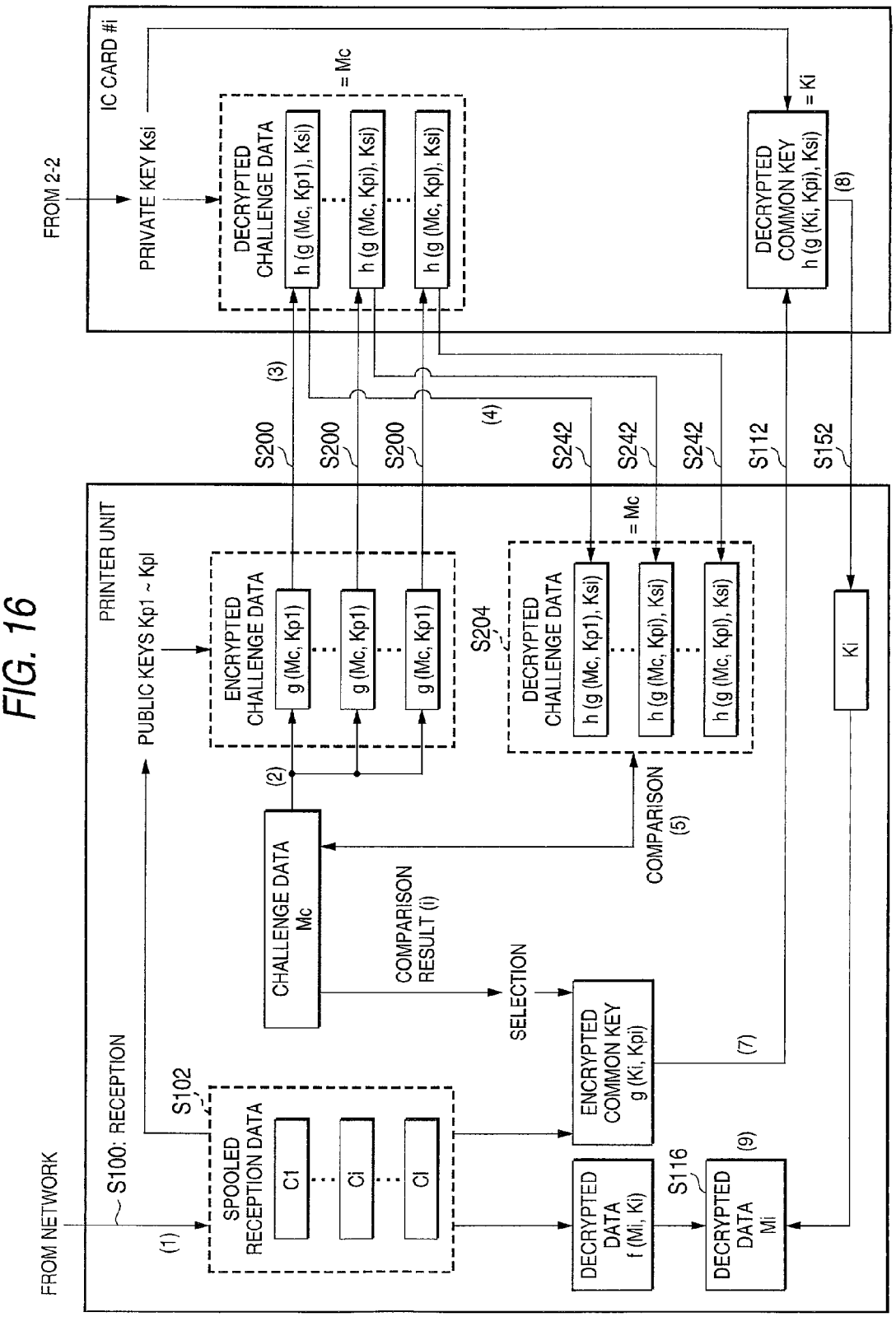
FIG. 16 is a diagram showing the outline of processing of the complex copy machine and the IC card in a second method for decrypting encrypted data f(Mi, Ki).

FIG. 16 is a diagram showing the outline of the processing of the complex copy machine 2-1 and the IC card 6-*i* in the second method for decrypting the encrypted data f(Mi, Ki).

Figure 17:
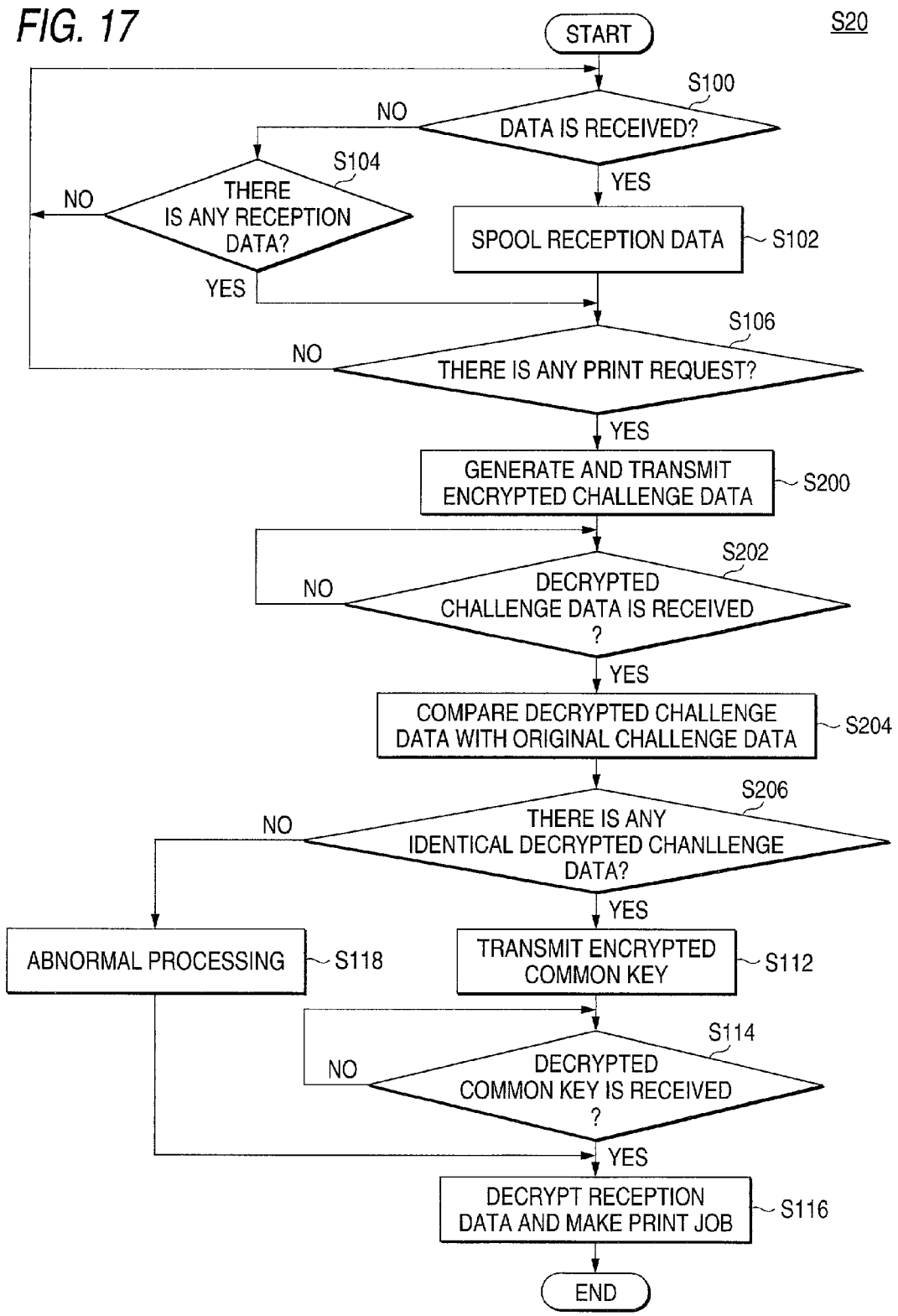
FIG. 17 is a flow chart showing the operation (S20) of the complex copy machine (the decryption program.

FIG. 17 is a flow chart showing the operation (S20) of the complex copy machine 2-1 (the decryption program 200; FIG. 9) in the second method for decrypting the encrypted data f(Mi, Ki).

Figure 18:
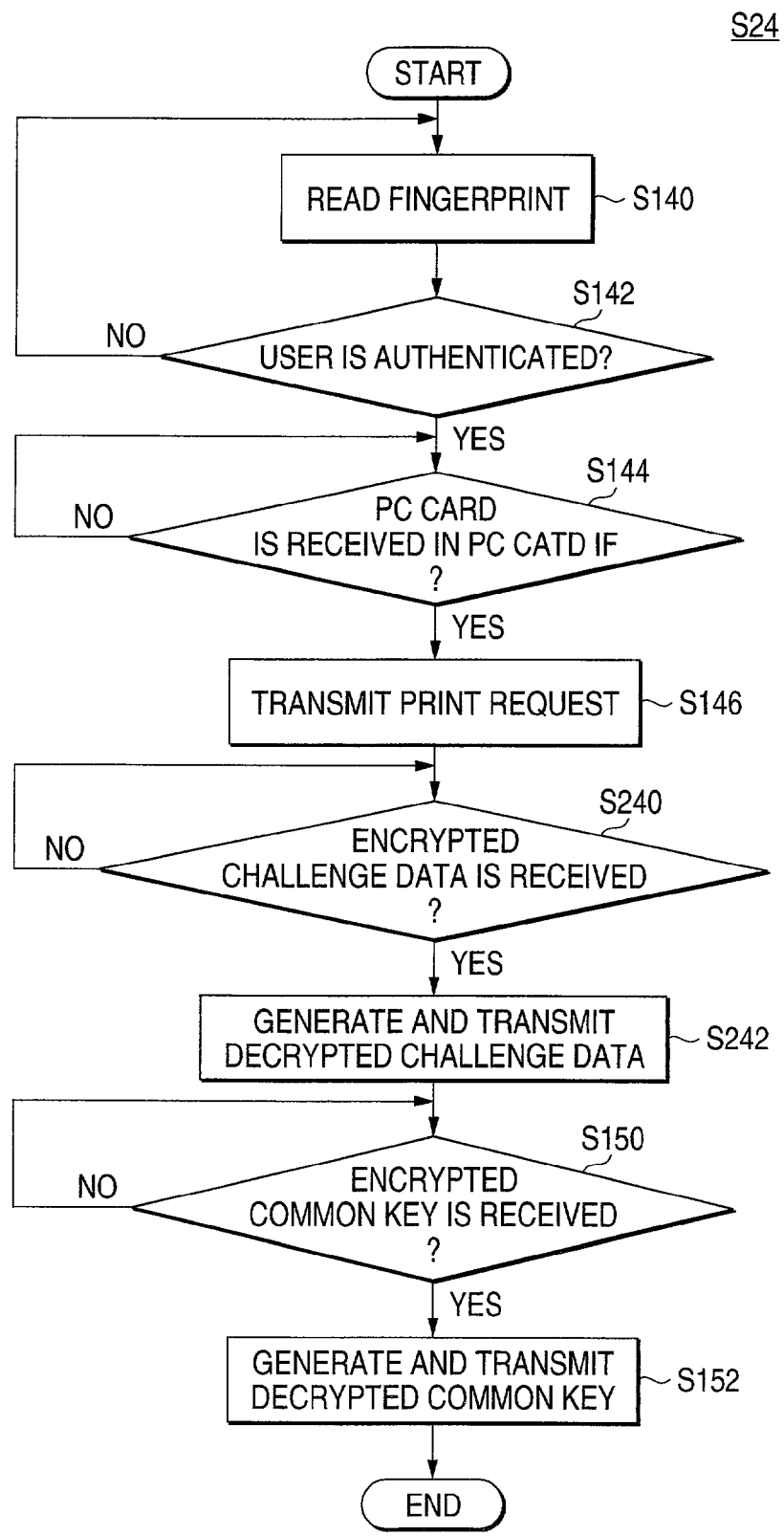
FIG. 18 is a flow chart showing the operation (S24) of the IC card (the common key decryption program.

FIG. 18 is a flow chart showing the operation (S24) of the IC card 6-*i* (the common key decryption program 620; FIG. 11) in the second method for decrypting the encrypted data f(Mi, Ki).

Figure 19:
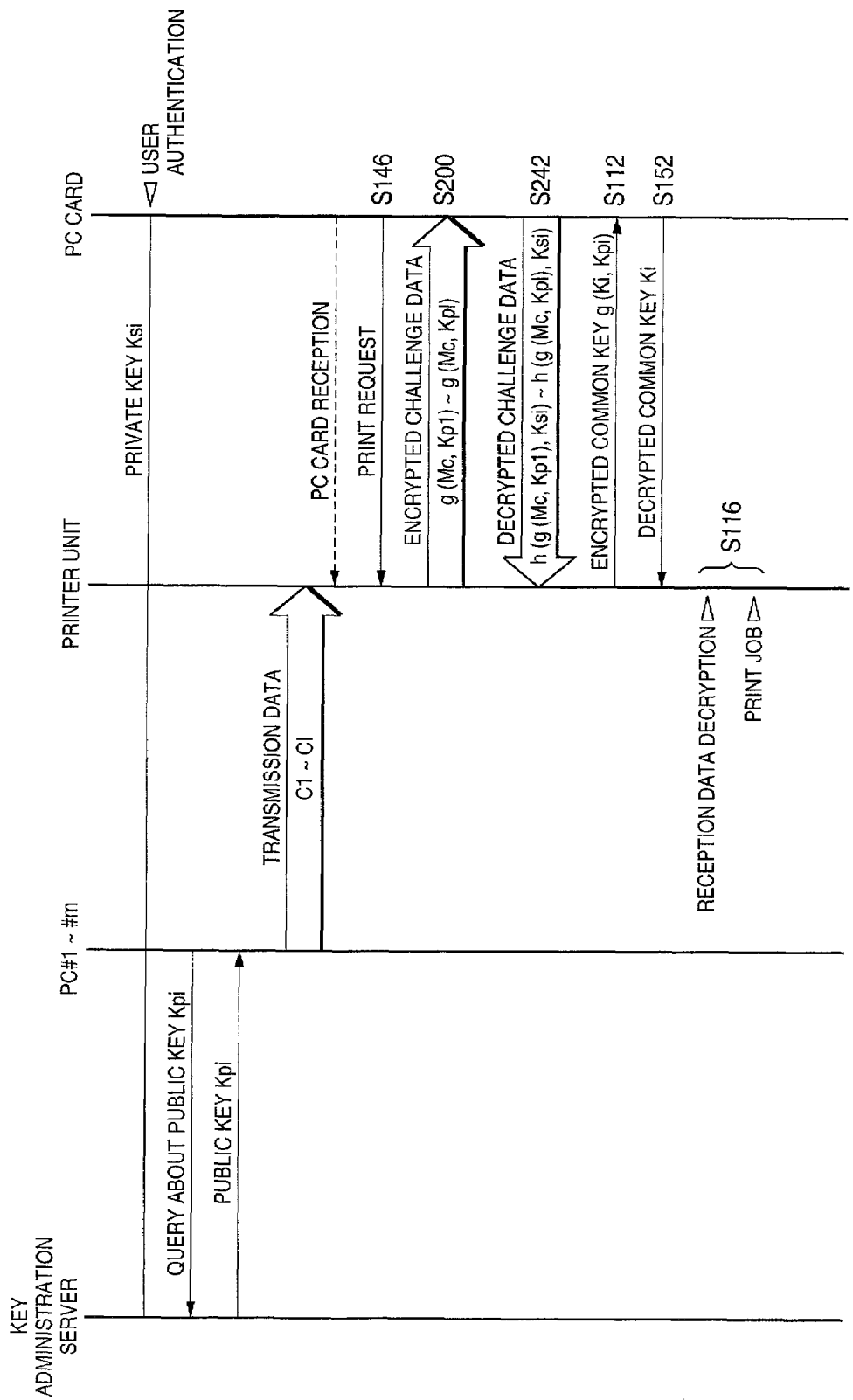
FIG. 19 is a diagram showing a signal sequence among the computers, the complex copy machine, the key administration server and the IC card in the second method for decrypting the encrypted data f(Mi, Ki).

FIG. 19 is a diagram showing a signal sequence among the computers 5-1 to 5-*m*, the complex copy machine 2-1, the key administration server 2-2, and the IC card 6-$i$ in the second method for decrypting the encrypted data f(Mi, Ki).

Incidentally, steps substantially the same as those shown in FIGS. 13 and 14 are referred to correspondingly in FIGS. 17 and 18.

Incidentally, in the second method, differently from those in the first method, a private key Ksi and a public key Kpi are generated by the key administration program 240 (FIG. 12) of the key administration server 2-2 (FIGS. 1 and 4).

In addition, the public key Kpi is supplied from the key administration server 2-2 to the complex copy machine 2-1 (the decryption program 200; FIG. 9), and the private key Ksi is set for the IC card 6-$i$.

Further, in the complex copy machine 2-1, reception data Ci is retrieved using challenge data.

[Operation of Complex Copy Machine 2-1 in Second Method]

First, the operation of the complex copy machine 2-1 (the decryption program 200; FIG. 9) in the second method will be described with reference to FIGS. 16 and 17.

As shown in FIGS. 16 and 17, in Step 100 (S100), the communication control portion 202 (FIG. 9) of the decryption program 200 executed by the control unit 4 (FIG. 3) of the complex copy machine 2-1 judges whether transmission data (FIG. 8) has been received from the computer 5 or not ((1) in FIG. 16).

The decryption program 200 advances to the processing of S102 when transmission data has been received, or advances to the processing of S104 otherwise.

In Step 102 (S102), the communication control portion 202 supplies the received transmission data to the reception data storage portion 204 in the form of reception data. The reception data storage portion 204 spools the reception data supplied from the communication control portion 202 as shown in FIG. 10 ((2) in FIG. 16).

In Step 104 (S104), the reception data storage portion 204 judges whether the reception data has been spooled or not.

The decryption program 200 advances to the processing of S106 when the reception data has been spooled, or returns to the processing of S100 otherwise.

In Step 106 (S106), the reception data storage portion 204 judges whether a print request has been issued as control information from the IC card 6-$i$ received in the PC card IF 48 (FIG. 3) or not.

The decryption program 200 advances to the processing of S200 when a print request has been issued from the IC card 6-$i$, or returns to the processing of S100 otherwise.

In Step 200 (S200), the challenge data encryption portion 212 uses a common key Ki to encrypt challenge data Mc generated by the challenge data generation portion 210. Encrypted challenge data g(Mc, Kp1) to g(Mc, Kpl) generated thus is transmitted to the IC card 6-$i$ ((3) in FIG. 16).

In Step 202 (S202), the comparison portion 214 judges whether decrypted challenge data h(g(Mc, Kp1), Ks1) to h(g(Mc, Kpl), Ksl) has been received from the IC card 6-$i$ or not.

The decryption program 200 advances to the processing of S204 when the decrypted challenge data h(g(Mc, Kp1), Ks1) to h(g(Mc, Kpl), Ksl) has been received, or stays in the processing of S202 otherwise.

In Step 204 (S204), the reception data storage portion 204 compares the challenge data Mc with the received decrypted challenge data h(g(Mc, Kp1), Ks1) to h(g(Mc, Kpl), Ksl), and judges whether any one of the decrypted challenge data h(g(Mc, Kp1), Ks1) to h(g(Mc, Kpl), Ksl) coincides with the challenge data Mc or not.

The decryption program 200 advances to the processing of S112 when any one of the decrypted challenge data h(g(Mc, Kp1), Ks1) to h(g(Mc, Kpl), Ksl) coincides with the challenge data Mc, or advances to the abnormal processing of S118 ((5) in FIG. 16) otherwise.

In Step 112 (S112), the comparison portion 214 supplies a comparison result i to the reception data selection portion 208 ((6) in FIG. 16). The reception data selection portion 208 selects reception data Ci (FIG. 10) corresponding to the comparison result i, and transmits an encrypted common key g(Ki, Kpi) included in the reception data Ci to the IC card 6-$i$ ((7) in FIG. 16).

In Step 114, (S114), the reception data decryption portion 216 judges whether a decrypted common key Ki (=h(g(Ki, Kpi), Ksi)) has been received from the IC card 6-$i$ or not.

The decryption program 200 advances to the processing of S116 when the decrypted common key Ki has been received, or stays in the processing of S114 otherwise.

In Step 116 (S116), the reception data decryption portion 216 uses the received decrypted common key Ki to decrypt encrypted data f(Mi, Ki) of the reception data Ci and supply original data Mi obtained thus to the print control portion 218.

The print control portion 218 controls the copy machine body (FIG. 2) and so on, so as to print the data Mi supplied from the reception data decryption portion 216 ((9) in FIG. 16).

[Operation of IC Card 6-$i$ in Second Method]

First, the operation of the IC card 6-$i$ (the common key decryption program 620; FIG. 11) in the second method will be described with reference to FIGS. 16 and 18.

As shown in FIG. 16, first, the IC card 6-$i$ is received in the PC card IF 48 (FIG. 4) of the key administration server 2-2, so that a private key Ksi is set by the key administration server 2-2. The key generation/storage portion 622 of the common key decryption program 620 stores the private key Ksi set for the IC card 6-$i$.

As shown in FIGS. 16 and 18, in Step 140 (S140), the authentication/control portion 628 controls the input unit 606 (FIG. 5) so as to read a fingerprint of a user pressed against the input surface thereof.

In Step 142 (S142), the authentication/control portion 628 judges whether the fingerprint read by the input unit 606 has been recognized as a fingerprint of a legitimate user of the IC card 6-$i$ by the fingerprint recognition unit 604.

The common key decryption program 620 authenticates the user as the legitimate user of the IC card 6-$i$ and advances to the processing of S144 when the input fingerprint has been recognized as the fingerprint of the legitimate user. Otherwise, the common key decryption program 620 returns to the processing of S140.

In Step 144 (S144), the authentication/control portion 628 judges whether the IC card 6-$i$ has been received in the PC card IF 48 (FIG. 4) of the complex copy machine 2-1 or not.

The common key decryption program 620 advances to the processing of S146 when the IC card 6-$i$ has been received in the PC card IF 48, or stays in the processing of S144 otherwise.

In Step 146 (S146), the authentication/control portion 628 transmits a print request to the complex copy machine 2-1.

In Step 240 (S240), the challenge data decryption portion 624 judges whether encrypted challenge data g(Mc, Kp1) to g(Mc, Kpl) has been received from the complex copy machine 2-1 or not ((3) in FIG. 16).

The common key decryption program 620 advances to the processing of S242 when the encrypted challenge data g(Mc, Kp1) to g(Mc, Kpl) has been received, or stays in the processing of S240 otherwise.

In Step 242 (S242), the challenge data decryption portion 624 uses the private key Ksi to decrypt the received encrypted challenge data g(Mc, Kp1) to g(Mc, Kpl) so as to generate decrypted challenge data h(g(Mc, Kp1), Ks1) to h(g(Mc, Kpl), Ksl), which is transmitted to the complex copy machine 2-1 ((4) in FIG. 16).

Incidentally, as is understood easily, only h(g(Mc, Kpi), Ksi) obtained by using the private key Ksi to decrypt the challenge data g(Mc, Kpi) encrypted with the public key Kpi corresponding to the private key Ksi is decrypted into the original challenge data Mc.

In Step 150 (S150), the common key decryption portion 626 judges whether an encrypted common key g(Ki, Kpi) has been received from the complex copy machine 2-1 or not.

The common key decryption program 620 advances to the processing of S152 when the encrypted common key g(Ki, Kpi) has been received, or stays in the processing of S150 otherwise.

In Step 152 (S152), the common key decryption portion 626 decrypts the received encrypted common key g(Ki, Kpi) with the private key Ksi supplied from the key generation/storage portion 622 so as to generate a decrypted public key Kpi. The decrypted public key Kpi is transmitted to the complex copy machine 2-1 ((8) in FIG. 16).

[Total Operation of Network System 1 in Second Method]

The total operation of the network system 1 in the second method will be described further with reference to FIG. 19.

First, as described previously with reference to FIG. 12, the key generation portion 242 of the key administration program 240 executed in the key administration server 2-2 generates public keys Kp1 to Kpl and private keys Ks1 to Ksl, and the key DB 244 stores and administers the public keys Kp1 to Kpl and the private keys Ks1 to Ksl generated thus.

The IC card 6-i authenticates a user by fingerprint.

The IC card 6-i is received in the PC card IF 48 (FIG. 4) of the key administration server 2-2, and the private key writing portion 246 of the key administration program 240 sets a private key Ksi for the key generation/storage portion 622 of the common key decryption program 620 of the IC card 6-i.

The key generation/storage portion 622 stores the private key Ksi set from the key administration server 2-2.

In response to a query about a public key Kpi from any one of the computers 5-1 to 5-m to the key administration server 2-2 through the network 10 (FIG. 1), the communication control portion 248 of the key administration program 240 transmits the query to the key DB 244.

The key DB 244 supplies the public key Kpi to the communication control portion 248 in accordance with the query. The communication control portion 248 feeds the public key Kpi back to the one of computers 5-1 to 5-m making the query through the network 10.

In addition, as described previously with reference to FIG. 7, the data generation portion 502 of the encryption program 500 executed in the computer 5 generates data Mi in accordance with the operation of the user or the like. The data encryption portion 504 encrypts the data Mi with a common key Ki so as to generate encrypted data f(Mi, Ki).

The common key encryption portion 506 encrypts the common key Ki with the public key Kpi so as to generate an encrypted common key g(Ki, Kpi). The transmission data composition portion 508 associates the encrypted data f(Mi, Ki) supplied from the data encryption portion 504, the encrypted common key g(Ki, Kpi) supplied from the common key encryption portion 506, and the public key Kpi used for creating the encrypted common key g(Ki, Kpi), as shown in FIG. 8. Thus, transmission data Ci is generated.

The communication control portion 510 controls the communication unit 42 (FIG. 4) of the computer 5 so as to transmit the transmission data Ci to the complex copy machine 2-1 through the network 10.

When transmission data C1 to Cl is transmitted from the computers 5-1 to 5-m to the complex copy machine 2-1 respectively, the complex copy machine 2-1 receives the transmission data C1 to Cl and spools the transmission data C1 to Cl in the form of reception data C1 to Cl as shown in FIG. 10.

When the IC card 6-i received in the PC card IF 48 (FIG. 3) of the complex copy machine 2-1 transmits a print request to the complex copy machine 2-1 (S146; FIG. 18), the complex copy machine 2-1 generates challenge data Mc and encrypts the challenge data Mc with the public keys Kp1 to Kpl for the reception data C1 to Cl respectively. Encrypted challenge data g(Mc, Kp1) to g(Mc, Kpl) generated thus is transmitted to the IC card 6-i (S200; FIG. 17).

The IC card 6-i decrypts the received encrypted challenge data g(Mc, Kp1) to g(Mc, Kpl) with the private key Ksi so as to generate decrypted challenge data h(g(Mc, Kp1), Ks1) to h(g(Mc, Kpl), Ksl), which is transmitted to the complex copy machine 2-1 (S242; FIG. 18).

The complex copy machine 2-1 compares the received decrypted challenge data h(g(Mc, Kp1), Ks1) to h(g(Mc, Kpl), Ksl) with the original challenge data Mc, selects reception data Ci offering decrypted challenge data h(g(Mc, Kpi), Ksi) identical to the original challenge data Mc, and transmits the encrypted common key g(Ki, Kpi) of the selected reception data Ci to the IC card 6-i (S112; FIG. 17).

The IC card 6-i decrypts the encrypted common key g(Ki, Kpi) received from the complex copy machine 2-1 by use of the private key Ksi, and transmits a common key Ki decrypted thus to the complex copy machine 2-1 (S152).

When the IC card 6-i feeds the decrypted common key Ki back to the complex copy machine 2-1 (S152; FIG. 14), the complex copy machine 2-1 decrypts the encrypted data f(Mi, Ki) by use of the decrypted common key Ki and makes a print job (S116; FIG. 17).

[Method for Sending Same Encrypted Data to Plural Destinations]

A method for sending one piece of encrypted data to a plurality of destinations will be described below.

Figure 20:
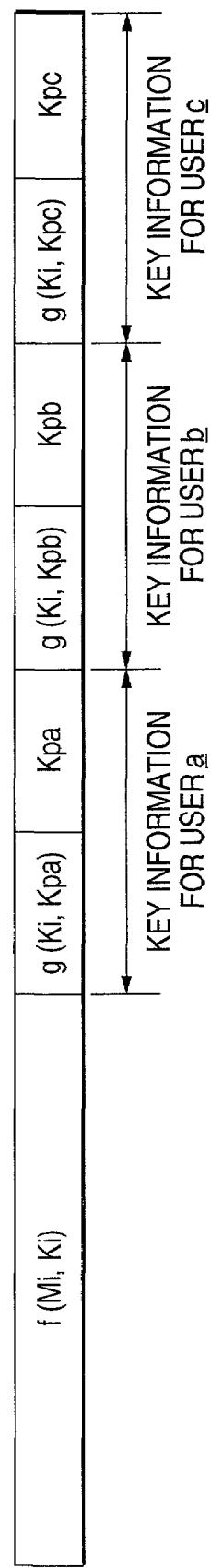
FIG. 20 is table showing a format of transmission data Ci when one piece of encrypted data f(Mi, Ki) is sent to a plurality of destinations.

FIG. 20 is a table showing a format of transmission data Ci when one piece of encrypted data f(Mi, Ki) is sent to a plurality of destinations.

In order to make it possible to send one piece of encrypted data to a plurality of destinations, for example, three users a to c, first, as shown in FIG. 20, a function to add encrypted common keys g(Ki, Kpa) to g(Ki, Kpc) respectively encrypted with public keys Kpa to Kpc for the users a to c and the public keys Kpa to Kpc to the encrypted data f(Mi, Ki), and send the encrypted data f(Mi, Ki) added with the encrypted common keys g(Ki, Kpa) to g(Ki, Kpc) and the public keys Kpa to Kpc to the complex copy machine 2-1 is added to the encryption program 500 (FIG. 7) executed by the computer 5.

Further, in the first method, a function to receive transmission data Ci shown in FIG. 20 and decrypt and print the encrypted data f(Mi, Ki) when any one of the public keys Kpa to Kpc contained in the transmission data Ci coincides with a public key Kp transmitted from the IC card 6-i to the complex copy machine 2-1 is added to the decryption program 200 (FIG. 11) executed by the complex copy machine 2-1.

Alternatively, in the second method, a function to receive transmission data Ci shown in FIG. 20 and decrypt and print the encrypted data f(Mi, Ki) when any one of decrypted challenge data h(g(Mc, Kpa), Ksa) to h(g(Mc, Kpc), Ksc) fed back to the complex copy machine 2-1 by the IC card 6-$i$ coincides with original challenge data Mc is added to the decryption program 200.

MODIFICATIONS

Incidentally, although FIGS. 1 to 6 show the case where a common key Ki is decrypted by use of the IC card 6, for example, a cellular phone or a portable terminal may be used in place of the IC card 6.

In this case, it will be understood easily that communication between the complex copy machine 2-1 and the cellular phone or the portable terminal can be made when the PC card IF 48 is replaced by a unit that can make communication with the cellular phone or the portable terminal through a cable line or a radio or infrared line.

In addition, although the complex copy machine 2-1 is shown by way of example in this embodiment, not to say, the encryption/decryption method according to the invention is applicable broadly to other kinds of servers for decrypting encrypted data and offering various services.

In addition, not to say, in the first method, a public key and a private key generated by the key administration server 2-2 may be used. Further, in the second method, a public key and a private key generated inside the IC card 6 may be used.

In addition, although the embodiment has shown the case where only one private key Ksi is stored in the IC card 6-$i$ by way of example, a plurality of private keys Ksi may be stored in the IC card 6-$i$. In this case, the complex copy machine 2-1 may be designed to decrypt reception data Ci corresponding to these private keys Ksi respectively.

As described above, an encryption/decryption system, encryption apparatus, decryption apparatus and methods for those system and apparatus according to the invention are suitable to applications for outputting data from a server only when a user making a request for service gains access to the server even if the server is shared by a plurality of users.

In addition, the encryption/decryption system, the encryption apparatus, the decryption apparatus and the methods for those system and apparatus according to the invention are suitable to applications for transmitting messages from unspecified senders to unspecified receivers securely.

In addition, according to the encryption/decryption system, the encryption apparatus, the decryption apparatus and the methods for those system and apparatus according to the invention, it is not necessary to input private information to a shared server when a user receives encrypted data from the shared server. It is therefore possible to enhance the security.

In addition, according to the encryption/decryption system, the encryption apparatus, the decryption apparatus and the methods for those system and apparatus according to the invention, data addressed to a plurality of users can be encrypted and surely delivered to the addressed users through the shared server respectively.

In addition, according to the encryption/decryption system, the encryption apparatus, the decryption apparatus and the methods for those system and apparatus according to the invention, any user can easily search and receive encrypted data addressed to the user himself/herself when a large number of pieces of encrypted data are spooled on the reception side.

What is claimed is:

1. An encryption/decryption system comprising:
a mobile first decryption apparatus that includes:
a first decryption unit that decrypts supplied first encrypted data with a private key of the mobile first decryption apparatus to obtain an encryption/decryption key, and
a third decryption unit that (1) decrypts supplied third encrypted data with the private key of the mobile first decryption apparatus, so as to obtain decrypted given data, and (2) supplies a second decryption apparatus with the decrypted given data;
an encryption apparatus that includes:
a first encryption unit that encrypts target data with the encryption/decryption key to generate second encrypted data,
a second encryption unit that encrypts the encryption/decryption key with a public key of the mobile first decryption apparatus to generate the first encrypted data, the encryption/decryption key used to encrypt data and to decrypt encrypted data, and
an association unit that associates the first encrypted data, the second encrypted data, and the public key of the mobile first decryption apparatus with each other; and
the second decryption apparatus that includes:
a reception unit that receives the first encrypted data, the second encrypted data, and the public key of the mobile first decryption apparatus associated with each other from the encryption apparatus, the public key received by the reception unit being unencrypted,
a second decryption unit that decrypts the received second encrypted data into the target data by using the encryption/decryption key,
a first encrypted data supply unit that (1) receives from the mobile first decryption apparatus the public key of the mobile first decryption apparatus, and (2) supplies the mobile first decryption apparatus with the first encrypted data which is associated with a public key that is identical to the public key received from the mobile first decryption apparatus,
a third encryption unit that (1) encrypts given data with the public key of the mobile first decryption apparatus received from the encryption apparatus so as to generate the third encrypted data, and (2) supplies the mobile first decryption apparatus with the third encrypted data, and
a second encrypted data supply unit that supplies the mobile first decryption apparatus with the first encrypted data, which correspond to the supplied public key of the mobile first decryption apparatus, in accordance with the supplied decrypted given data,
wherein the mobile first decryption apparatus transmits the encryption/decryption key to the second decryption apparatus, and
the second decryption unit decrypts the received second encrypted data into the target data by using the received encryption/decryption key.

2. The encryption/decryption system according to claim 1, wherein the second decryption apparatus further includes:
an output unit that outputs the decrypted target data.

3. The encryption/decryption system according to claim 1, wherein:
the mobile first decryption apparatus is one of an IC card, a cellular phone and a portable terminal unit; and the mobile first decryption apparatus further includes a communication unit that makes communication with the second decryption apparatus.

4. The encryption/decryption system according to claim 1, wherein:
the mobile first decryption apparatus further includes: a user identification unit that authenticates a user engaged in operation; and
the mobile first decryption apparatus operates only in accordance with operation of the authentic user.

5. The encryption/decryption system according to claim 1, wherein
the public key is supplied from the mobile first decryption apparatus to the second decryption apparatus, and
the first encrypted data is retrieved with the public key in the second decryption apparatus.

6. An encryption/decryption method comprising:
generating, by a mobile decryption apparatus, a public key and a private key for the mobile decryption apparatus;
encrypting, by a device other than the mobile decryption apparatus, an encryption/decryption key with the public key of the mobile decryption apparatus so as to generate first encrypted data;
encrypting, by the device other than the mobile decryption apparatus, target data with the encryption/decryption key to generate second encrypted data;
associating, by the device other than the mobile decryption apparatus, the first encrypted data, the second encrypted data, and the public key of the mobile first decryption apparatus with each other;
receiving, by a second decryption apparatus, the first encrypted data, the second encrypted data, and the public key of the mobile decryption apparatus associated with each other from the device other than the mobile decryption apparatus, the public key received by the second decryption apparatus from the device other than the mobile decryption apparatus being unencrypted;
receiving, by the second decryption apparatus, the public key of the mobile decryption apparatus from the mobile decryption apparatus;
encrypting, by the second decryption apparatus, given data with the received public key of the mobile decryption apparatus received from the device other than the mobile decryption apparatus so as to generate third encrypted data, the second decryption apparatus supplying the mobile decryption apparatus with the third encrypted data;
decrypting, by the mobile decryption apparatus, the supplied third encrypted data with the private key of the mobile decryption apparatus, so as to obtain decrypted given data, the mobile decryption apparatus supplying the second decryption apparatus with the decrypted given data;
supplying, by the second decryption apparatus, the mobile decryption apparatus with the first encrypted data, which correspond to the public key of the mobile decryption apparatus, in accordance with the supplied decrypted given data;
receiving, by the mobile decryption apparatus, the first encrypted data, the received first encrypted data being encrypted with a pubic key which has been determined to be identical to the generated public key of the mobile decryption apparatus;
decrypting, by the mobile decryption apparatus, the received first encrypted data with the generated private key of the mobile decryption apparatus, so as to obtain the encryption/decryption key;
transmitting the encryption/decryption key to the second decryption apparatus; and
decrypting, by the second decryption apparatus, the received second encrypted data into the target data by using the encryption/decryption key transmitted from the mobile decryption apparatus.

* * * * *